US008230412B2

(12) United States Patent
De Atley et al.

(10) Patent No.: US 8,230,412 B2
(45) Date of Patent: Jul. 24, 2012

(54) COMPATIBLE TRUST IN A COMPUTING DEVICE

(75) Inventors: Dallas Blake De Atley, San Francisco, CA (US); Joshua de Cesare, Campbell, CA (US); Michael Smith, Sunnyvale, CA (US); Jerry Hauck, Windermere, FL (US); Jeffrey Bush, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1362 days.

(21) Appl. No.: 11/897,655

(22) Filed: Aug. 31, 2007

(65) Prior Publication Data

US 2009/0063108 A1 Mar. 5, 2009

(51) Int. Cl.
*G06F 9/44* (2006.01)
*G06F 9/00* (2006.01)
*G06F 7/04* (2006.01)

(52) U.S. Cl. ............... 717/165; 713/2; 726/18; 726/19; 726/21

(58) Field of Classification Search ........................ None
See application file for complete search history.

(56) References Cited

U.S. PATENT DOCUMENTS

| 4,975,950 | A | | 12/1990 | Lentz |
| 5,121,345 | A | | 6/1992 | Lentz |
| 5,155,847 | A | * | 10/1992 | Kirouac et al. ............... 709/221 |
| 5,359,730 | A | * | 10/1994 | Marron ........................ 717/169 |
| 5,600,823 | A | * | 2/1997 | Sherer et al. .................... 703/20 |
| 6,185,678 | B1 | | 2/2001 | Arbaugh et al. |
| 6,738,932 | B1 | * | 5/2004 | Price ........................... 714/38.11 |
| 6,961,465 | B2 | * | 11/2005 | Shah ............................. 382/181 |
| 7,194,092 | B1 | * | 3/2007 | England et al. ............... 380/262 |
| 7,512,616 | B2 | * | 3/2009 | Corcoran et al. ...................... 1/1 |
| 7,673,297 | B1 | * | 3/2010 | Arsenault et al. ............ 717/168 |
| 7,752,617 | B2 | * | 7/2010 | Blinick et al. ................ 717/170 |
| 7,861,236 | B2 | * | 12/2010 | Grebenev ...................... 717/142 |
| 2002/0133576 | A1 | | 9/2002 | Koymans et al. |
| 2003/0041250 | A1 | * | 2/2003 | Proudler ....................... 713/182 |
| 2003/0095096 | A1 | | 5/2003 | Robbin et al. |
| 2003/0110372 | A1 | * | 6/2003 | Proudler ....................... 713/150 |

(Continued)

FOREIGN PATENT DOCUMENTS

EP   1 698 992 A   9/2006

(Continued)

OTHER PUBLICATIONS

PCT Notification of Transmittal of the International Search Report and Written Opinion of the International Searching Authority, or the Declaration, for the PCT Int'l. Appin. No. US2008/009008, mailed Apr. 21, 2009, (21 pages).

(Continued)

*Primary Examiner* — Tuan Dam
*Assistant Examiner* — Zheng Wei
(74) *Attorney, Agent, or Firm* — Blakely, Sokoloff, Taylor & Zafman LLP

(57) ABSTRACT

A method and apparatus for executing a first executable code image having a first version number into a memory of a device in an attempt to establish an operating environment of the device are described. The first executable code image retrieves a second version number from the second executable code image after successfully authenticating the second executable code image. If the first version number and the second version number do not satisfy a predetermined relationship, the second executable code image is prevented from being loaded by the first executable code image.

22 Claims, 18 Drawing Sheets

U.S. PATENT DOCUMENTS

| | | |
|---|---|---|
| 2003/0194094 A1 | 10/2003 | Lampson et al. |
| 2004/0224638 A1 | 11/2004 | Fadell et al. |
| 2005/0033980 A1* | 2/2005 | Willman et al. .............. 713/200 |
| 2005/0076209 A1* | 4/2005 | Proudler ........................ 713/165 |
| 2005/0125548 A1* | 6/2005 | England et al. ............... 709/229 |
| 2005/0132186 A1 | 6/2005 | Khan et al. |
| 2005/0262486 A1* | 11/2005 | Grebenev ...................... 717/140 |
| 2006/0031790 A1* | 2/2006 | Proudler et al. .................. 716/1 |
| 2006/0090084 A1 | 4/2006 | Buer |
| 2006/0092323 A1* | 5/2006 | Feeler et al. ................... 348/553 |
| 2006/0174240 A1 | 8/2006 | Flynn |
| 2006/0200859 A1* | 9/2006 | England et al. ................. 726/17 |
| 2006/0217072 A1* | 9/2006 | Poyhonen et al. ......... 455/67.11 |
| 2007/0079306 A1* | 4/2007 | Qumei .......................... 717/168 |
| 2007/0169077 A1* | 7/2007 | Cepulis et al. ................ 717/168 |
| 2008/0165952 A1* | 7/2008 | Smith et al. ...................... 380/28 |
| 2008/0165971 A1* | 7/2008 | de Cesare et al. ............. 380/277 |
| 2008/0168275 A1* | 7/2008 | De Atley et al. .............. 713/189 |
| 2008/0209548 A1* | 8/2008 | Haselsteiner et al. ........... 726/21 |

FOREIGN PATENT DOCUMENTS

| | | |
|---|---|---|
| EP | 1 705 936 A2 | 9/2006 |
| WO | WO 2005/033914 A1 | 4/2005 |

OTHER PUBLICATIONS

PCT Invitation to Pay Additional Fees for PCT/US2008/009008, mailed Feb. 11, 2009, ( 7 pages).

* cited by examiner

COMPATIBLE TRUST IN A COMPUTING DEVICE

FIELD OF INVENTION

The present invention relates generally to electronic security. More particularly, this invention relates to booting a computing device securely.

BACKGROUND

As more and more computing devices are being used in people's daily life, security has become a widespread concern for users and content providers. Viruses, worms, Trojan horses, identity theft, software and media content piracy, and extortion using threats of data destruction are rampant. Usually, these attacks involve installing and executing malicious software codes to expose access to device resources that would otherwise be private to the system, the content provider, the user or an application.

For example, a hacker program when running in consumer computing devices developed to play audio/video content, such as Hollywood movies or music, could potentially allow the cracking of the encryption used to secure the A/V content. Therefore, high levels of security are usually required for such devices.

An operating system may provide some security features to guard against such attacks. However, the security features of an operating system often fail to keep up with new attacks occurring on a daily basis. Moreover, when booting a computing device, security features may not yet be initialized and are vulnerable to bypass and/or tampering.

Another way to guard against these attacks is to completely seal a computing device from installing and/or running any additional software after shipped out from manufacturers. Such a strict measure, however, severely limits the capabilities and the flexibilities of the underlying computing device. Not only does it make upgrading a computing device costly and difficult, it is not able to take advantage of increasing number of applications which do require downloading and running software codes from outside the device. In addition, the rapid technology advancement usually renders the applications or functionalities originally built inside a computing device obsolete within a very short period of time.

Therefore, current security measures do not deliver a robust solution to protect applications and content inside a computing device, while at the same time providing the flexibility to update the software and or firmware for the device.

SUMMARY OF THE DESCRIPTION

A method and apparatus for executing a first executable code image having a first version number into a memory of a device in an attempt to establish an operating environment of the device are described herein. The first executable code image retrieves a second version number from the second executable code image after successfully authenticating the second executable code image. If the first version number and the second version number do not satisfy a predetermined relationship, the second executable code image is prevented from being loaded by the first executable code image.

In an alternative embodiment, a plurality of executable code images are loaded in sequence in order to establish an operating environment of a portable device. A current executable code image is configured to authenticate a next executable code image in the sequence. Upon successfully authenticating the next executable code image, the current code image examines a version of the next executable code image. If the version of the next executable code image does not satisfy a predetermined relationship with respect to a version of the current executable code image, the next executable code image is prevented from being loaded.

In yet another alternative embodiment, a first version of a first operating environment executed by a first processor of a device is examined in view of a second version of a second operating environment executed by a second processor in response to a service request from the first operating environment for a service provided by the second operating environment. The service request is denied if the first version and the second version do not satisfy a predetermined relationship.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
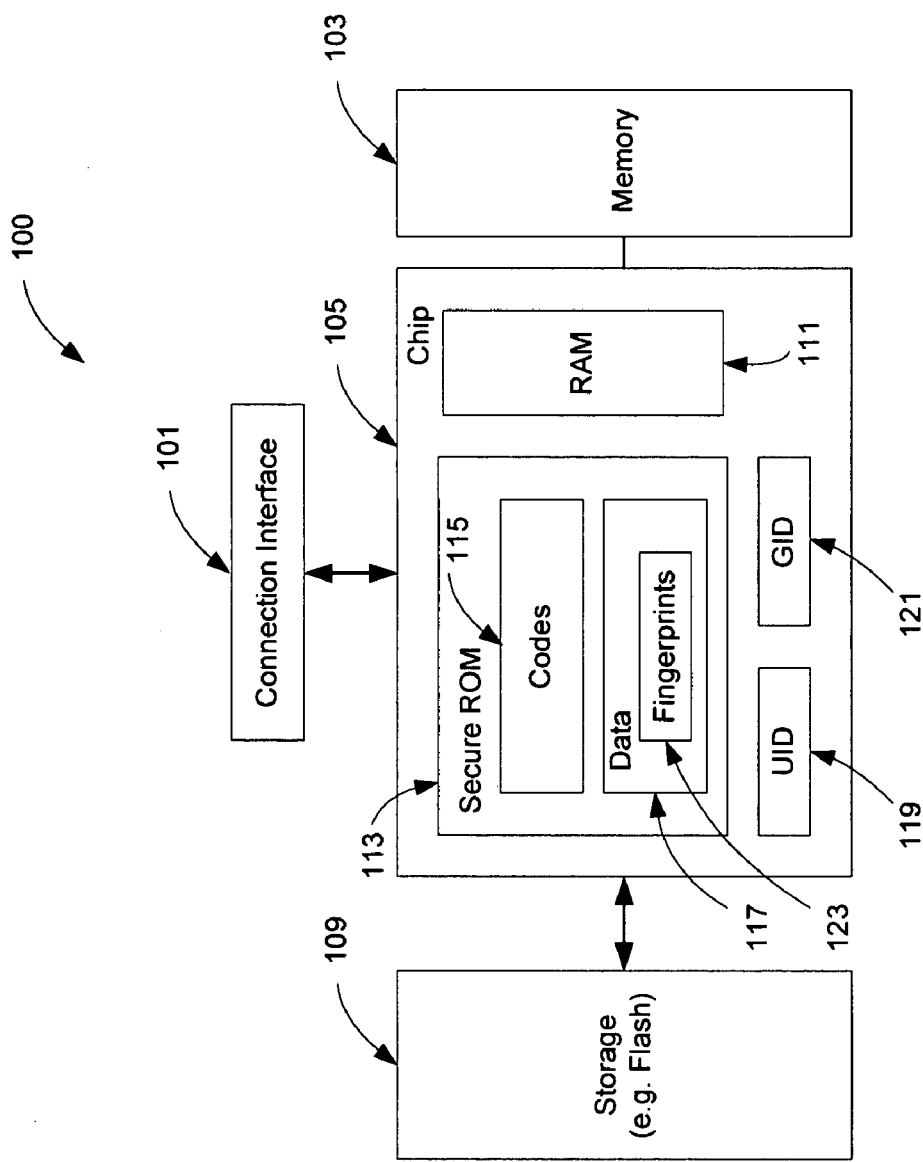
FIG. 1 is a block diagram illustrating one embodiment of system components for secure booting.

A method and an apparatus for secure booting of a computing device are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

In one embodiment, secure booting a device may be designed to ensure critical resources within the device will be protected in an operating environment. In the mean time, secure booting a device may provide a flexibility to allow software running inside the device to be updated and installed under different policies and procedures without requiring unnecessary management, material and/or performance costs. In one embodiment, the security of booting a device may be performed by the code and data stored inside a secure storage area such as a ROM (Read Only Memory), also referred to as a secure ROM, integrated together within the device. The content of a secure ROM may be stored during a manufacturing stage of the device. The secure ROM may be associated with a UID (Unique Identifier) of the device, which uniquely identifies the device. A trust of a software code running in the device may be rooted from a code image signed through the secure ROM based on the UID.

According to one embodiment, the secure ROM of a device may include a fingerprint of a root certificate of a trusted entity. A code image certified through the trusted entity may be trusted to be executed in the device according to a certification process via the secure ROM based on the fingerprint. In one embodiment, secure booting the device may recover trusted software codes when coupled with the trusted entity according to the secure ROM. The secure ROM may extend a trust to a code image certified through the fingerprint based on the device UID stored. In one embodiment, the secure ROM may allow application software restoration by certifying a code image downloaded from an external connection. In another embodiment, the secure ROM may force cleaning up user data stored inside the device by a trusted software code downloaded through external connection.

FIG. 1 is a block diagram illustrating one embodiment of system components for secure booting. System 100 may reside in one or more chips inside a device. In one embodiment, system 100 may include a chip 105 coupled with a memory component 103. Chip 105 may also include a RAM (Random Access Memory) component 111, such as an SRAM (Static Random Access Memory) or an EDRAM (Embedded Dynamic Random Access Memory). A code image may be loaded into the memory component 103 prior to being executed by the device. When executed, a code image may enable a user application, a system application, and/or an operating environment (e.g. operating system) for the device that supports the user or system application. In one embodiment, memory component 103 includes DDR (Double Data Rate) memory. Chip 105 may include a ROM 113 storing codes 115 and associated data 117. Codes 115 may include implementation of SHA (Secure Hashing Algorithm) hashing functions such as cryptographic hash functions SHA-1, SHA-224, SHA-256, SHA-384, and SHA-512. Additionally, codes 115 may include implementations of data encrypting algorithms such as AES (Advanced Encryption Standard) encryption. In one embodiment, codes 115 may cause hardware initialization for the device to support a connection or communication interface such as USB (Universal Serial Bus). Codes 115 may include instructions to change the clock rate of the device. Note that throughout this application, SHA and AES are utilized as examples for the illustration purposes only; it will be appreciated that other hashing and/or encryption techniques may also be utilized.

In one embodiment, codes 115 may cause loading a code image into a device memory such as memory component 103 or RAM 111. A code image may be loaded from a storage component 109 coupled with the chip 105. The storage component 109 may be a flash memory, such as a NAND flash, a NOR flash, or other mass storage (e.g., hard disk) components. In another embodiment, a code image may be loaded though a connection interface 101 from a source external to the device. The connection interface 101 may be based on a USB connection, an Ethernet connection, or a wireless network connection (e.g., IEEE 802.1x), etc. In one embodiment, codes 115 may cause storing a code image from a device memory into the storage component 109 after verifying the code image includes only trusted codes.

Before the device may start executing the code image loaded in the device memory, codes 115 may perform verification operations on the loaded code image to ensure the code image could be trusted. In one embodiment, codes 115 may verify a loaded code image according to data included in the chip 105, such as the data section 117 inside the ROM, a UID 119 and/or a GID (Global Identifier) 121. UIDs 119 may be unique for each device. In one embodiment, all devices are associated with a single GID 121. In one embodiment, a GID may be used to encrypt a code image to prevent code inspection. Data section 117 of the ROM 115 may store a fingerprint 123 based on a signature from a trusted entity such as a public key certificate. In one embodiment, separate devices may include fingerprints 123 based on the same trusted entity.

Figure 2:
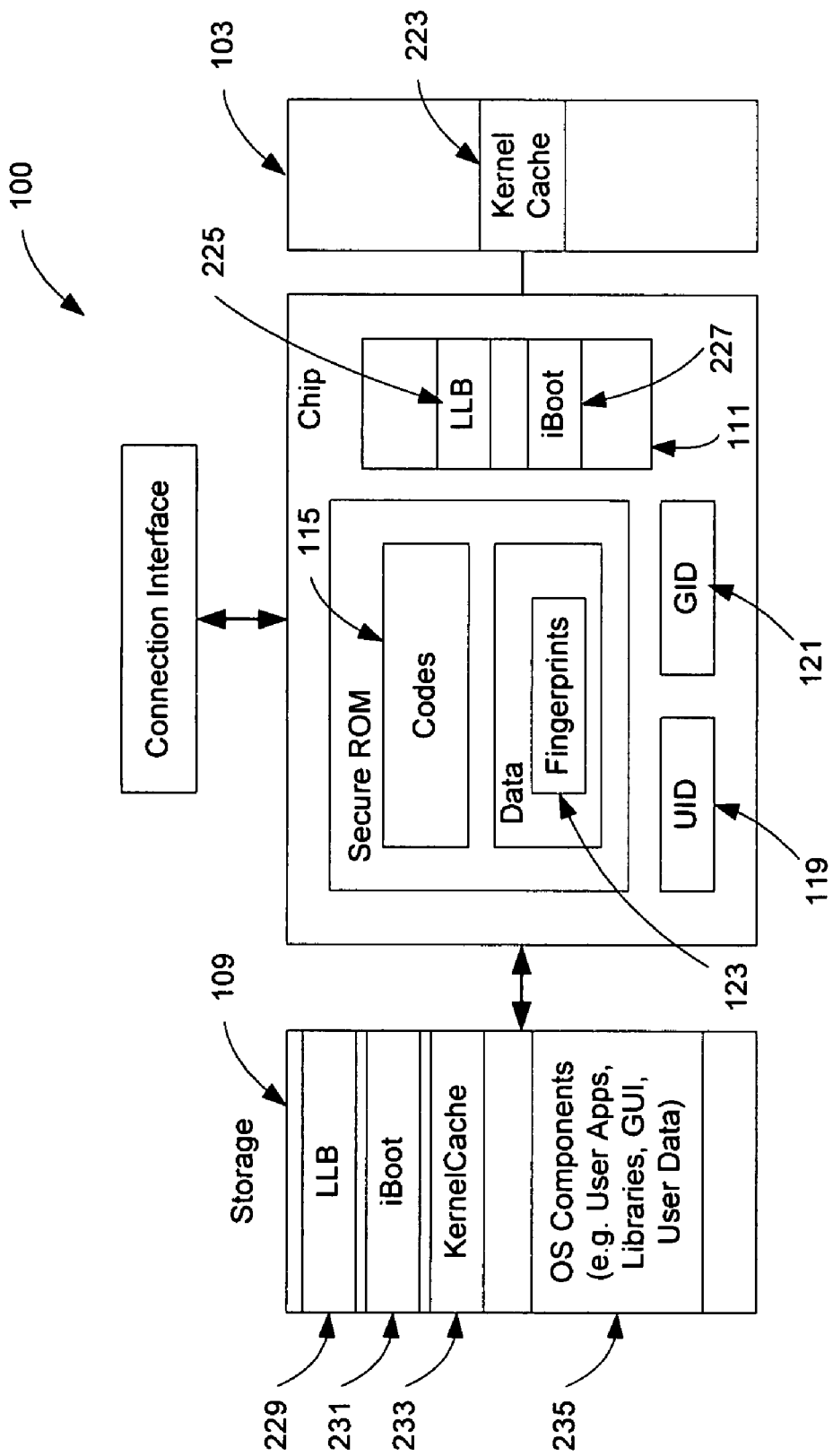
FIG. 2 is a block diagram illustrating one embodiment of system components executing secure booting.

FIG. 2 is a block diagram illustrating one embodiment of system components executing secure booting. System 100 may load an LLB (Low Level Boot) code image 229 from storage component 109 into RAM 111 as LLB 225. LLB 225 may be related to long term power management of the system 100. In one embodiment, LLB 225 may include an identification of the version of system 100. Code image LLB 225 may be loaded based on execution of codes 115. In one embodiment, code image LLB 229 may be stored from RAM 111 based on code image LLB 225 via execution of codes 115.

Code image iBoot 227, according to one embodiment, may be loaded into memory component 111 from storage 109 based on code image iBoot 231 according to execution of LLB 225. Code image iBoot 231 may cause hardware initialization for an operating system that provides an operating environment for the device housing system 100. A device may enter an operating environment after a successful booting. An operating environment may support various user and/or system applications running in the device. In one embodiment, code image iBoot 231 may enable mass storage components of the device, initialize graphic components for user interface, and/or activate screen components for the device, etc. Code image iBoot 231 may be stored from RAM 111 based on code image iBoot 227 via execution of code image LLB 225.

In one embodiment, code image Kernelcache 223 may be loaded from storage 109 to memory 103 based on code image Kernelcache 233. Code image Kernelcache 233 may be part of the kernel of an operating system to support the operating environment for the device. In one embodiment, code image Kernelcache 223 causes a kernel and operating system components 235 to be loaded into memory 103 from storage 109. Operating system components may include user applications, libraries, graphic user interface components, and/or user data 235. User data may include music, images, videos or other digital content associated with a user of the device. For example, such user data may be DRM (digital rights management) compliant data having restricted usages. Code image Kernelcache 223 may enable loading the kernel and the operating system components 235 into memory 103. In one embodiment, code image Kernelcache 223 may cause a verification process to ensure the kernel is trusted before being executed in memory 103. In another embodiment, code image Kernelcache 223 may cause a verification process to ensure an operating system component 235 is trusted before being executed in memory 103. Code image Kernelcache 223 may be executed to determine an operating system component 235 is trusted based on UID 119 or fingerprints 123. In one embodiment, code image Kernelcache 223 may cause decryption of an operation system component 235 in memory 103 according to GID 121. In one embodiment, code image Kernelcache 223 may be executed to store operating system components 235 from memory 103 into storage 109. Code image Kernelcache 223 may enable encrypting operating system components 235 before being stored in the storage 109.

In one embodiment, UID 119 may be accessible to some operating system components running in a privileged mode. The kernel of the operating system may deny or approve an application to access UID 119 by an application depending on whether the application is running in a privileged mode. In one embodiment, the kernel of the operating system may determine whether an application can be run in a privileged mode based on whether the corresponding code image of the application includes a properly signed signature. A DRM (Digital Right Management) system may be running in a privileged mode to control access to user data of the operating system components 235 based on UID 119. An application may access user data through a DRM system. In some embodiments, network utilities of the operation system may be privileged. Network utilities may enable the device to interconnect with outside resources though an interface chip, such as base band chip. In another embodiment, virus protection software may be provided by the operating system to run in a privileged mode.

Thus, any software components that will be running within the system must be verified or authenticated prior to the execution, unless the software components satisfy certain predetermined conditions (e.g., provided by a trust vendor or during certain circumstances such as manufacturing of the device or testing of the software components). In one embodiment, the settings of a secure storage area in the system may be associated with a predetermined condition. As a result, any data such as DRM compliant data would not be accessed or compromised without proper verification or authentication.

Figure 3:
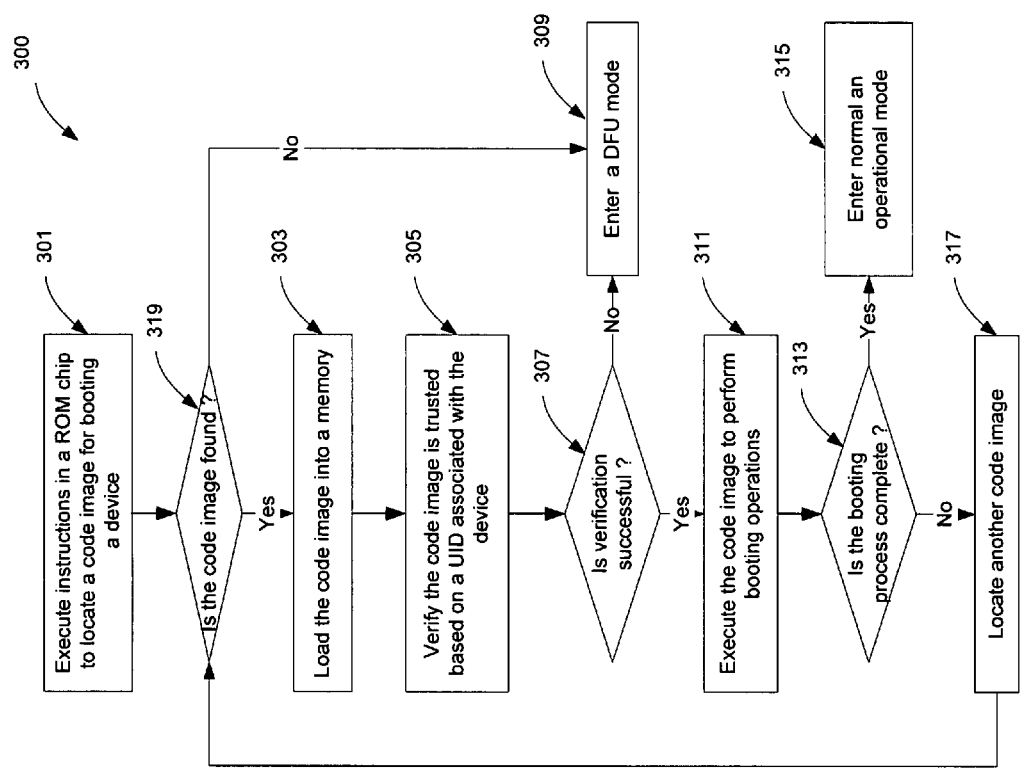
FIG. 3 is a flow diagram illustrating one embodiment of a process to perform secure booting.

FIG. 3 is a flow diagram illustrating one embodiment of a process to perform secure booting. For example, process 300 may be performed by system 100 of FIG. 1. During a booting process of a device, according to one embodiment, the processing logic of process 300 may locate a code image from within the device by executing instructions in a ROM chip at block 301. The instructions may be read from a code section of the ROM chip as in codes 115 of FIG. 1. The code image may be stored in a memory component or a storage component of the device. A memory component may be a RAM. A storage component may be a flash memory or a mass storage device attached to the device. In one embodiment, if the code image could not be located, the booting process may be interrupted and the device may enter a DFU (Device Firmware Upgrade) mode at block 309. If the code image is located successfully, according to one embodiment, the processing logic of process 300 may load the code image into a memory at block 303. In another embodiment, the code image may already been loaded in the memory when located.

At block 305, according to one embodiment, the processing logic of process 300 may verify whether the loaded code image could be trusted based on a UID associated with the device such as UID 119 of FIG. 1. The processing logic of process 300 may extract a header value from the code image. The location of the header value inside the code image may be predetermined. In one embodiment, the header value may be extracted based on a preset attribute in an attribute value pair inside the code image. The header value may include a signature value signed over the code image according to the UID of the device through well-known hashing and encryption algorithms. In one embodiment, the processing logic of process 300 derives another signature value from the code image according to the UID through the same well-known hashing and encryption algorithms at block 305. The processing logic of process 300 may compare the derived signature value and the extracted signature value to verify whether the code image is trusted. In one embodiment, the verification may be successful if the derived signature value and the extracted signature match with each other. Otherwise, the verification may fail. If the verification is not successful, the processing logic of process 300 may cause the device to enter a DFU mode at block 309. In one embodiment, the processing logic of process 300 may remove the code image from the memory before the device enters the DFU mode at block 309.

If the verification is successful, the processing logic of process 300 may execute the code image at block 311. In one embodiment, the code image may be an LLB, an iBoot or a Kernelcache as shown in 225, 227 and 223 in FIG. 2. The processing logic of process 300 may perform booting operations for the device at block 311. Booting operations may include product identifications, starting device power management, enabling mass storage components, initializing graphic components for user interface, activating screen components and/or device hardware initialization, etc. In one embodiment, booting operations may include loading an operating system to the memory including a kernel and certain operating system components such as shown in 235 of FIG. 2. The processing logic of process 300 may attach a trust indicator to a trusted code image in the memory to indicate a successful verification. In one embodiment, a code image associated with a trust indicator located in a memory may be executed as a trusted code without verification. At block 313, the processing logic of process 300 may determine if the device is completely booted. If the device is completed booted, the device may become operational and enter a normal operational mode at block 315. In one embodiment, a Kernelcache 227 may start a user application running in a user mode after the device enters a normal operation. An application running in a user mode may not access device hardware related information such as UID 119 and GID 121 of FIG. 2. The device may enter a DFU mode if a booting operation fails at block 313.

At block 317, according to one embodiment, the booting process may continue when the processing logic of process 300 determines the device booting process is not complete at block 313. The processing logic of process 300 may locate another code image at block 313 based on executing the current code image. In one embodiment, executing code image LLB may locate code image iBoot as shown in FIG. 2. In another embodiment, executing code image iBoot may locate code image Kernelcache as shown in FIG. 2. In some embodiments, executing code image Kernelcache may locate code images including the kernel and operating system components as shown in FIG. 2. The processing logic of process 300 may loop back to block 319 to proceed on the booting process according to the result of locating the next code image at block 317.

Figure 4:
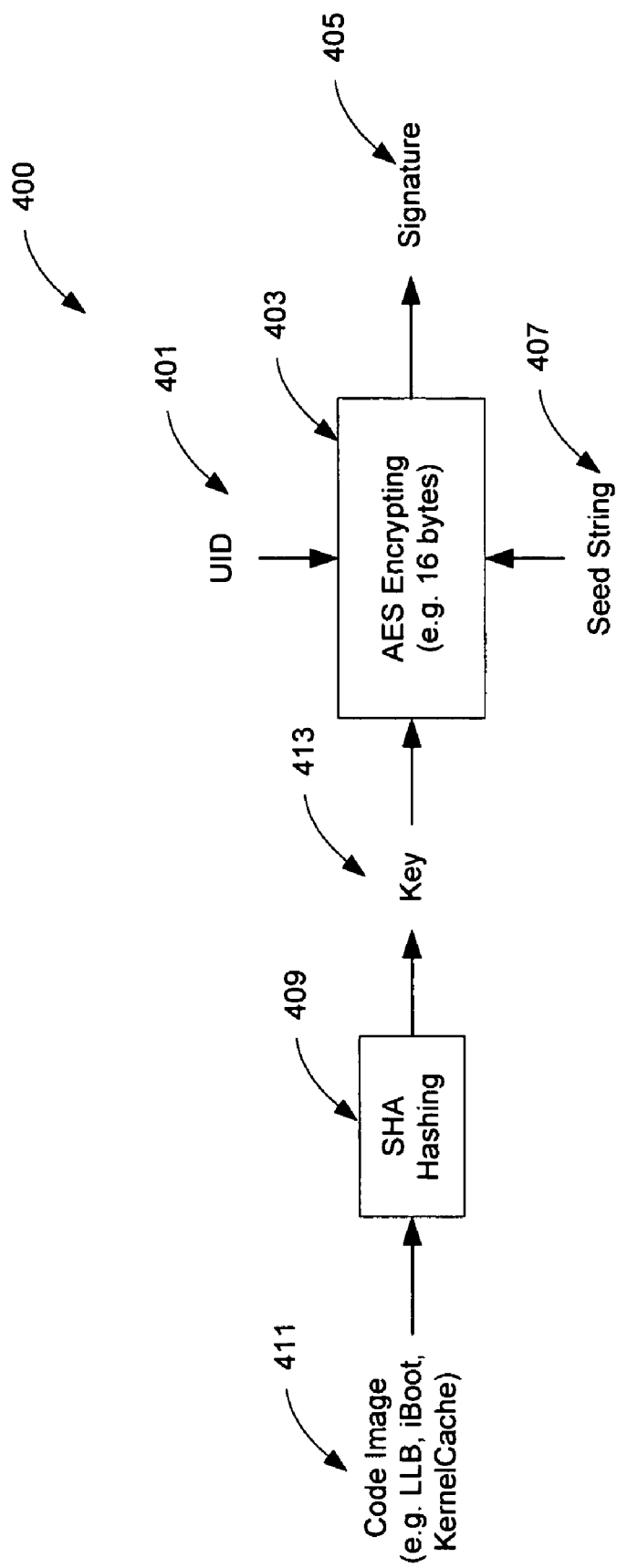
FIG. 4 is a flow diagram illustrating one embodiment of a process to generate a signature from a code image based on an UID (Unique Identifier) and a seed string.

FIG. 4 is a flow diagram illustrating one embodiment of a process to generate a signature from a code image based on an UID and a seed string. For example, process 400 may be performed by a system as shown in FIG. 1. In one embodiment, the processing logic of process 400 performs a hashing operation 409 over a code image 411, such as LLB 225, iBoot 227 or Kernelcache 223 shown in FIG. 2. The hashing operation may be based on SHA (Secure Hash Algorithm) hashing functions such as cryptographic hash functions SHA-1, SHA-224, SHA-256, SHA-384, and SHA-512. In one embodiment, hashing operation 409 may produce a key string 413. Key string 413 may have a length of 20 bytes. In one embodiment, the processing logic of process 400 may perform an encrypting operation at block 403 to generate a signature 405 based on key string 413, UID 401 and seed string 407 associated with a device. In one embodiment, the encrypting operation may be based on an AES (Advanced Encryption Standard) algorithm at block 403. The processing logic of process 400 may truncate key string 413 at block 403, such as discarding 4 out of 20 bytes of key string 413. In one embodiment, the AES algorithm at block 403 is based on 16 bytes. UID 401 may be stored within the device as UID 119 shown in FIG. 1. Seed string 407 may be generated through a seed generating function based on the device. In one embodiment, seed string 407 may be the same each time the seed generating function is applied for the same device.

Figure 5:
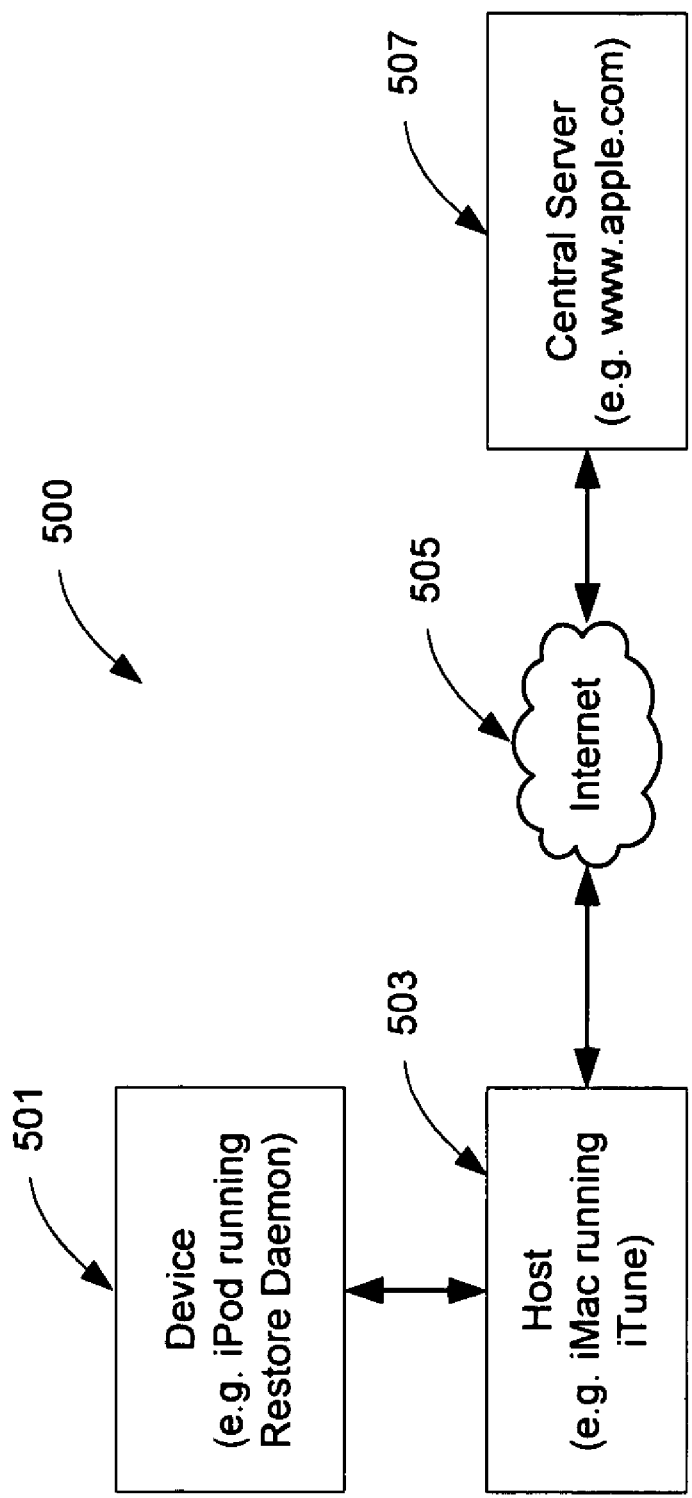
FIG. 5 is a block diagram illustrating one embodiment of network connections for a host to securely boot a device.

FIG. 5 is a block diagram illustrating one embodiment of network connections for a host to securely boot a device according to the system of FIG. 1. In one embodiment, a device may enter a DFU mode for booting by connecting to a host. A device may be forced to enter a DFU mode based on an initiation from a user. In one embodiment, a device may enter a DFU mode in response to a user performing a predetermined action such as pressing a button of the device. A user may request a device to enter a DFU mode for performing system management tasks for the device, including, for example, cleaning up user data, upgrading hardware drivers, upgrading user applications, and/or installing new applications, etc. A device may automatically enter a DFU mode when the device fails to boot in at least one stage of the booting sequence, such as shown at block 309 of FIG. 3. Alternatively, a device may enter a DFU mode when the operating system encounters an abnormality during normal operation such as when a corrupted data or damaged software components are detected.

According to one embodiment, network 500 may include a device 501 coupled with a host 503. Device 501 may be a media player such as, for example, an iPod from Apple Inc. running restoring daemon application to restore operating system components from the coupled host 503. Device 501 may be coupled with host 503 through a connection interface supporting TCP/IP protocols. The connection interface may be based on USB, a wireless network or an Ethernet, etc. In one embodiment, host 503 may be a Mac or Windows based computer running application software such as, for example, an iTune application from Apple Inc. Host 503 may be connected to a central server 507 through the network 505 such as wide area network (e.g., Internet) or local area network (e.g., Intranet or peer-to-peer network). In one embodiment, central server 507 may be based on a publicly accessible web server. Alternatively, server 507 may be an Intranet or local server.

Figure 6:
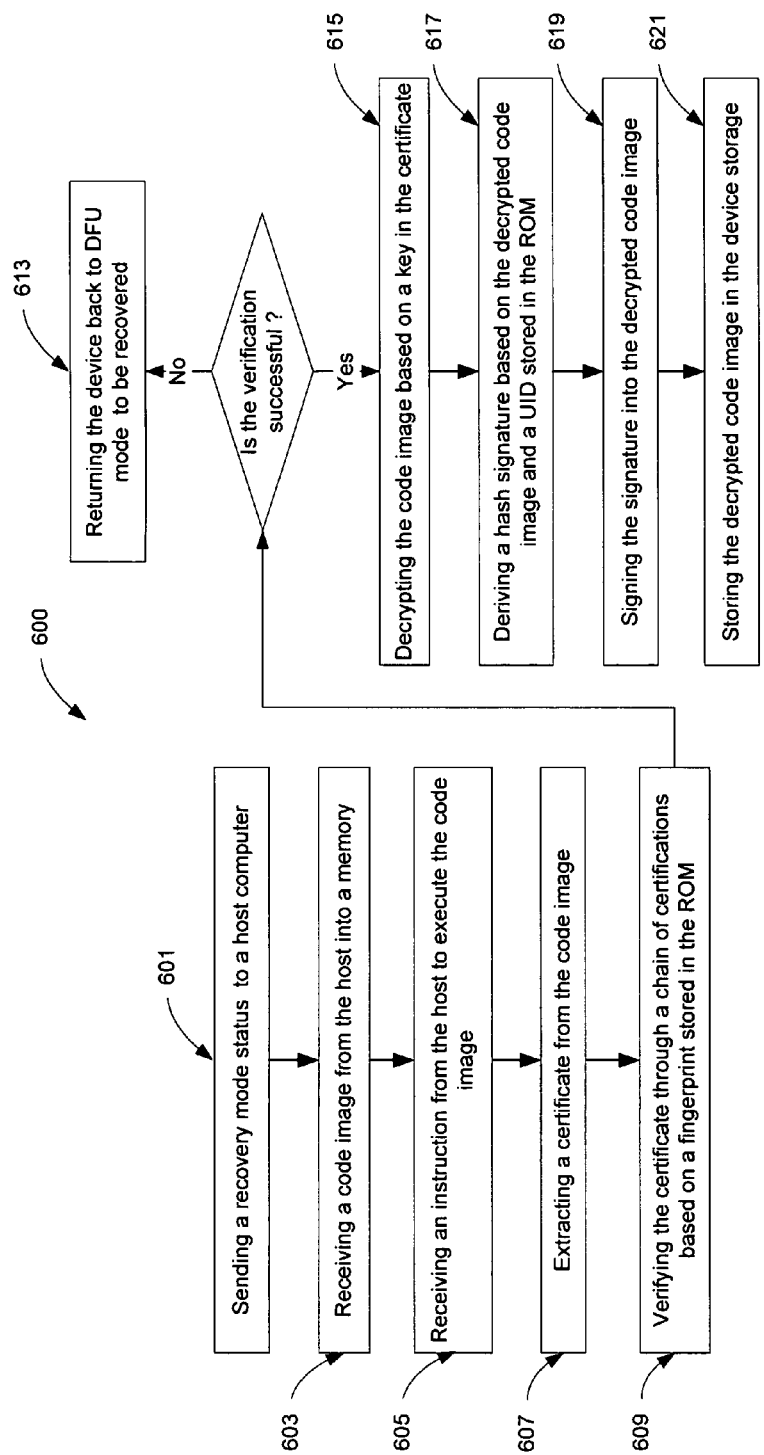
FIG. 6 is a flow diagram illustrating an embodiment of a process to securely recover an operating environment from a host to a device.

FIG. 6 is a flow diagram illustrating an embodiment of a process to securely recover an operating environment from a host to a device. For example, process 600 may be performed by systems as shown in FIGS. 1 and/or 5. In one embodiment, the processing logic of process 600 may send a status to a host computer indicating a device being in a recovery mode at block 601. The device may enter the recovery mode in response to a failure to verify a code image. The host computer may be coupled to a device performing process 600 as shown in FIG. 5. In one embodiment, the status may include a product ID and/or a vendor ID. The host computer may prepare a code image to recover the connected device based on the received status. In one embodiment, the code image may be retrieved from a central server computer by the host computer connected over a network such as network 505 as shown in FIG. 5. At block 603, according to one embodiment, the processing logic of process 600 may receive the code image from the host computer into a memory component of a device, such as memory 103 as shown in FIG. 1. The processing logic of process 600 may receive an instruction from the host computer to execute the received code image at block 605. In one embodiment, process 600 may be controlled by recovery software running on the host computer, such as iTune running in a MAC based computer.

According to one embodiment, at block 607, the processing logic of process 600 may extract a certificate accompanying the code image received in the memory of the device. The code image may be a LLB, an iBoot and/or a Kernelcache as shown in FIG. 2. The code image may be encrypted according to public key cryptography such as RSA (Ralph Shamir Adelman) public key cryptography. The certificate may include a key based on X.509 standard. At block 609, the processing logic of process 600 may verify the certificate according to the code stored in a secure ROM of the device such as code 115 shown in FIG. 1. In one embodiment, the processing logic of process 600 may certify a chain of certificates to verify the extracted certificate with a root certificate as the last certificate in the chain. The processing logic of process 600 may retrieve certificates from the connected host computer. In one embodiment, the root certificate may be verified based on the fingerprint stored in a secure ROM of the device, such as fingerprint 123 as shown in FIG. 1. The root certificate may be issued by Apple Inc. If the verification fails, the processing logic of process 600 may return the device back to DFU mode to be recovered at block 613.

If the certificate from the code image is successfully verified, the processing logic of process 600 may continue the recovery process at block 615 to decrypt the code image based on the key included in the verified certificate. At block 617, the processing logic of process 600 may derive a hash signature from the code image based on a UID stored in a secure ROM of the device, such as UID 119 as shown in FIG. 1. In one embodiment, the hash signature may be obtained, for example, according to the process as shown in FIG. 4. At block 619, the processing logic of process 600 may sign the derived signature into the code image. In one embodiment, the derived signature may be signed as a header value of the code image. The processing logic of process 600 may store the signed code image into a storage of the device at block 621, such as, for example, storage 109 shown in FIG. 1. In one embodiment, a signed code image may be stored to repair another code image failed to be verified in the device. In one embodiment, the code image may be executed before being stored into a storage of the device. In another embodiment, the code image may be stored into the storage of the device after being successfully executed.

Figure 7:
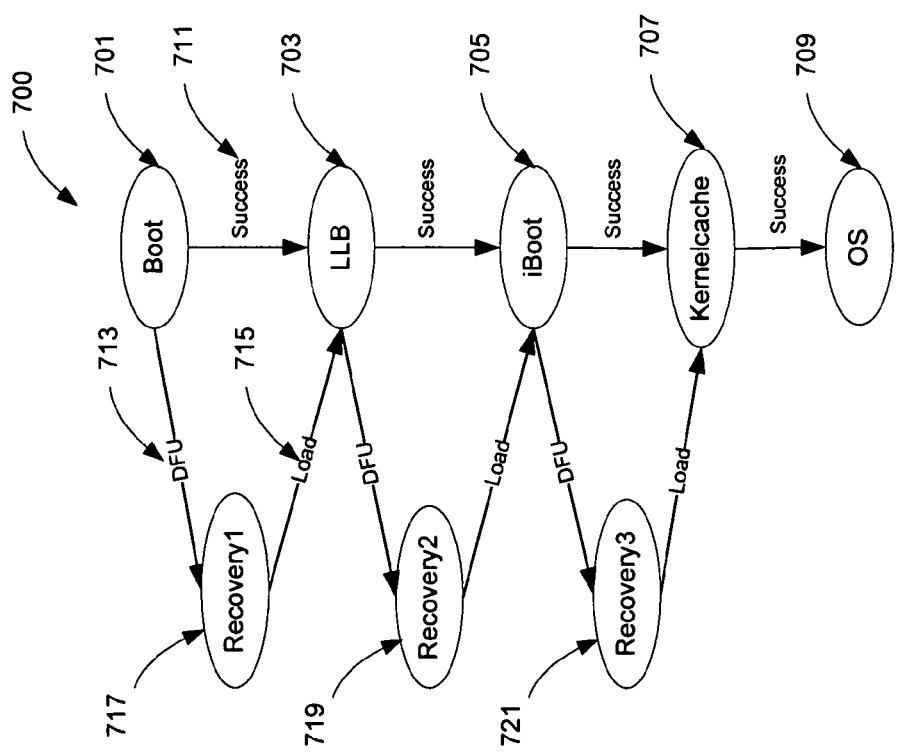
FIG. 7 is a state diagram illustrating an embodiment of a process to perform minimum secure recovery of an operating environment from a host to a device.

FIG. 7 is a state diagram illustrating an embodiment of a process to perform secure recovery of an operating environment from a host to a device. For example, states 700 may represent certain operating states of systems as shown in FIGS. 1 and/or 5. In one embodiment, a device may enter an initial state Boot 701 to start a boot process. Instructions stored in a secure ROM of the device may be executed during state Boot 701. In one embodiment, during state Boot 701, a low level boot program such as LLB 229 shown in FIG. 2 may be located within the device. The low level boot program may be located and loaded into a memory component of the device. In one embodiment, the located low level boot program may be verified to be a trusted code image according to a process such as described at block 305 of FIG. 3. If the low level boot program is successfully located and verified, state 700 may enter state LLB 703 from state Boot 701 according to transition Success 711. Otherwise, according to one embodiment, state 700 may enter state Recovery1 717 through transition DFU 713 as the device enters a DFU mode.

During state Recover1 717, the device may be coupled with a host computer to perform a recovery process such as shown in FIG. 5. In one embodiment, the device may publish a status based on state Recovery1 717. The host computer may send a code image corresponding to the status received from the device. In one embodiment, the code image may be an LLB 229 as shown in FIG. 2. The device may perform a chain of certifications to verify the received code image is trusted based on a UID and a fingerprint stored inside a secure ROM of the device such as UID 119 and fingerprints 123 of FIG. 1. The chain of certifications may be performed based on a process similar to process 600 at block 609 in FIG. 6. If the code image is successfully loaded and verified, in one embodiment, the state of the device may be transitioned from state Recovery1 717 to state LLB 703 through transition Load 715.

In one embodiment, during state LLB 703, the device may execute the verified low level boot program (e.g., LLB or low level library as described above) to locate another boot image such as iBoot 231 shown in FIG. 2 within the device. The boot image may be located and loaded into a memory component of the device during state LLB 703. In one embodiment, the boot image may be verified to be a trusted code image according to a process such as described at block 305 of FIG. 3. If the boot image is successfully located and verified, state 700 may enter state iBoot 705 from state LLB 703. Otherwise, according to one embodiment, state 700 may enter state Recovery2 719 as the device enters a DFU mode.

During state Recover2 719, the device may be coupled with a host computer to perform a recovery process such as shown in FIG. 5. In one embodiment, the device may publish a status based on state Recovery2 719. The host computer may send a code image corresponding to the status received from the device at state Reovery2 719. In one embodiment, the code image may be an iBoot 231 as shown in FIG. 2. The device may perform a chain of certifications to verify the received code image is trusted based on a UID and a fingerprint stored inside a secure ROM of the device such as UID 119 and fingerprints 123 of FIG. 1. The chain of certifications may be performed based on a process similar to process 600 at block 609 in FIG. 6. If the code image is successfully loaded and verified, in one embodiment, the state of the device may be transitioned from state Recovery2 719 to state Kernelcache 707.

During state iBoot 705, according to one embodiment, the device may execute the verified boot program to locate a kernel image such as Kernelcache 233 shown in FIG. 2 within the device. The kernel image may be located and loaded into a memory component of the device during state iBoot 705. In one embodiment, the kernel image may be verified to be a trusted code image according to a process such as described at block 305 of FIG. 3. If the kernel image is successfully located and verified, state 700 may enter state Kernelcache 707 from state iBoot 705. Otherwise, according to one embodiment, state 700 may enter state Recovery3 721 as the device enters a DFU mode.

During state Recover3 721, the device may be coupled with a host computer to perform a recovery process such as shown in FIG. 5. In one embodiment, the device may publish a status based on state Recovery3 721. The host computer may send a code image corresponding to the status received from the device at state Reovery3 721. In one embodiment, the code image may be a kernel image such as Kernelcache 233 of FIG. 2. The device may perform a chain of certifications to verify the received code image is trusted based on a UID and a fingerprint stored inside a secure ROM of the device such as UID 119 and fingerprints 123 of FIG. 1. The chain of certifications may be performed based on a process similar to process 600 at block 609 in FIG. 6. If the code image is successfully loaded and verified, in one embodiment, the state of the device may be transitioned from state Recovery3 721 to state Kernelcache 707.

In one embodiment, during state Kernelcache 707, the device may execute a verified kernel image to locate operating system components such as 235 in FIG. 2. A located operating system component may be loaded into a memory component of the device to be verified as trusted according to the execution of the verified kernel image during state Kernelcache 707. In one embodiment, the kernel image may determine whether an operating system component is trusted according to a process such as described at block 305 of FIG. 3. A privileged mode may be assigned to a trusted operating system component based on the kernel image for accessing hardware level interface of the device, such as UID 119 or GID 123 of FIG. 2. An operating system component without a signed signature may be assigned a user mode privilege during state Kernelcache 707. In one embodiment, an operating system component may not be permitted to access hardware level interface of the device. After the operation system is successfully loaded in to the memory of the device, state 700 may transition from state Kernelcache 707 to state OS 709 corresponding to a normal operating environment. A user application may start running in assigned user mode during state OS 709. In one embodiment, a device at state Kernelcache 707 may enter a DFU mode to receive a root image from a coupled host computer to restore or update operating system components for the device.

Figure 8:
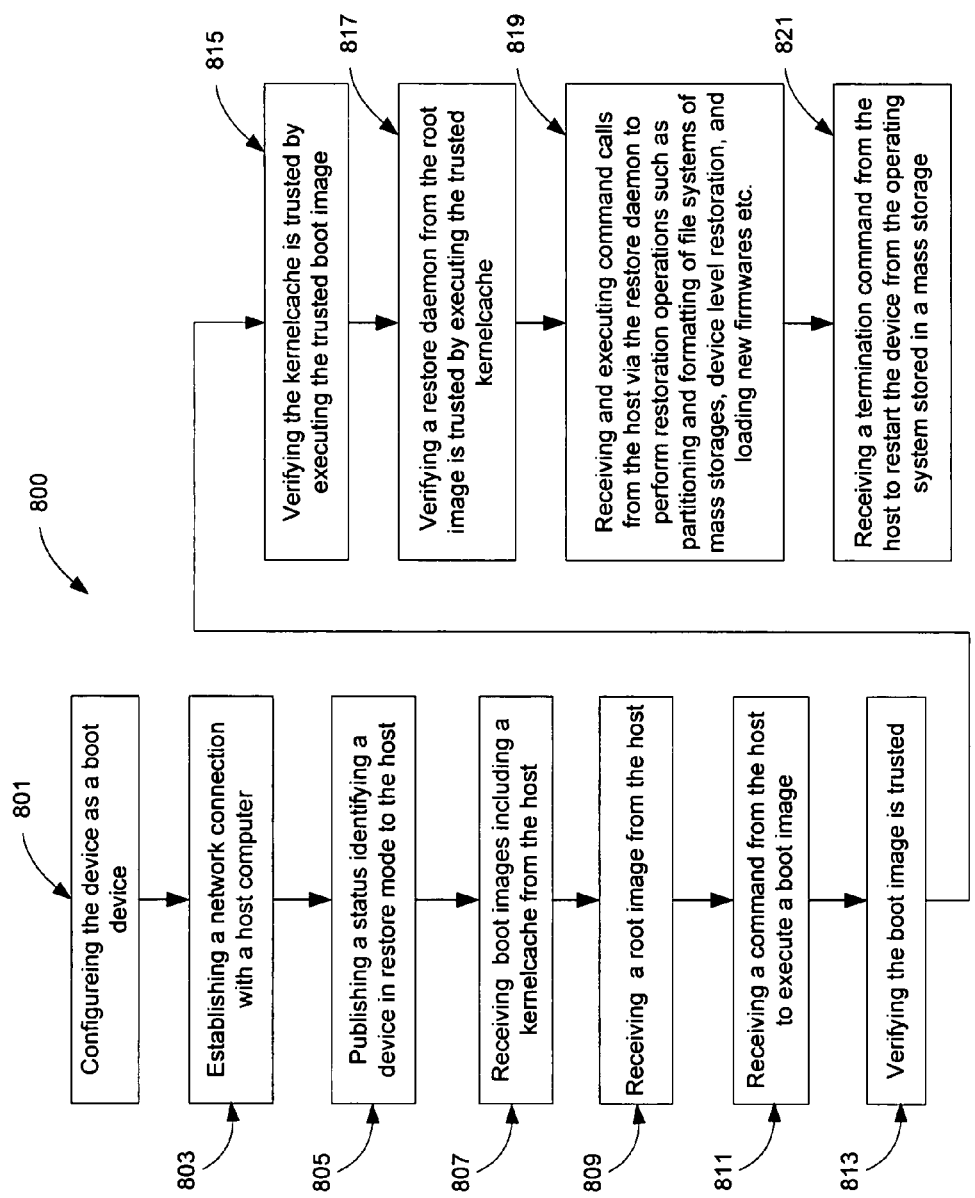
FIG. 8 is a flow diagram illustrating one embodiment of a process to securely restore software components from a host to a device.

FIG. 8 is a flow diagram illustrating one embodiment of a process to securely restore software components from a host to a device. For example, process 800 may be performed by systems as shown in FIGS. 1 and/or 5. In one embodiment, the processing logic of process 800 may configure the device as a boot device at block 801. A boot device may be in a DFU mode. A user may press a button of a device during a normal booting of the device to configure the boot device into DFU mode. The processing logic of process 800 may be activated intentionally by a device user to repair damaged application software, to update old application software, to install a firmware component or to manage existing user data stored in the device. At block 803, according to one embodiment, the processing logic of process 800 may establish a network connection with a host computer. The device and the host computer may be connected through a network interface such as shown in FIG. 5. A restore software, such as iTune from Apple Inc., may be running on the host computer to communicate with the device. The processing logic of process 800 may publish a status to the host computer to identify the device as in a restore mode via the network connection at block 805. A device in a restore mode may also be in a DFU mode. In one embodiment, the status may include information such as device ID and/or product ID. The status may include an indication of required code images from the host computer.

At block 807, according to one embodiment, the processing logic of process 800 may receive boot images from the connected host computer. The boot images may include a boot loader such as LLB 229 or iBoot 231 as shown in FIG. 2. In one embodiment, the boot images may include a kernel cache such as Kernelcache 233 in FIG. 2. A boot image may be received based on the status published to the host computer at block 805. In one embodiment, the boot images may be loaded into a memory component of the device such as memory 103 of FIG. 1. The processing logic of process 800 may receive a root image from the connected host computer at block 809. A root image may be a RAM disk based on a stripped down version of operating system for the device. In one embodiment, the root image may include a restore application.

At block 811, according to one embodiment, the processing logic of process 800 may receive a command from the connected host computer to execute a received boot image. The boot image may be a boot loader. In response, the processing logic of process 800 may verify the boot image is trusted at block 813. In one embodiment, the processing logic of process 800 may perform a process such as shown in FIG. 6 to determine whether the boot image could be trusted based on a secure ROM chip such as chip 105 in FIG. 1. In one embodiment, the processing logic of process 800 may verify a Kernelcache received from the connected host computer is trusted by executing a trusted boot image at block 815. The processing logic of process 800 may perform a process such as shown in FIG. 6 to determine whether the Kernelcache could be trusted based on a root certificate fingerprint stored in the device such as Fingerprints 123 in FIG. 1. At block 817, the processing logic of process 800 may verify a restore daemon application from the root image is trusted by executing the trusted Kernelcache. In one embodiment, the processing logic of process 800 may determine the restore daemon application could be trusted by verifying the root image is a trusted code image. The processing logic of process 800 may perform a process such as shown in FIG. 6 to determine whether the restore daemon application included in the root image could be trusted.

At block 819, according to one embodiment, the processing logic of process 800 may receive and execute commands calls from the host computer via the restore daemon application to perform software restoration operations. In one embodiment, software restoration operations may include the partitioning and formatting of file systems of mass storage, device level restoration or loading new firmware into the device. The processing logic may start the OS included in the root image to launch the restore daemon in the device. In one embodiment, only the reduced portion or minimal portion of the OS is started. This daemon application may communicate with the restore software running in the connected host computer based on an XML (Extensible Markup Language) protocol. In one embodiment, the restore daemon may allow the restore software running on the host computer to issue arbitrary commands to be executed by the device. The commands may include executing auxiliary tools included in the RAM disk and/or making library calls. In one embodiment, the commands may cause replacing the entire set of software stored in the mass storage and the programmable ROM of the device. At block 821, the processing logic of process 800 may receive a command from the connected host computer to restart the device. In response, the processing logic of process 800 may reset the device. Subsequently, the device may reboot from the operating system stored in the mass storage of the device.

Figure 9:
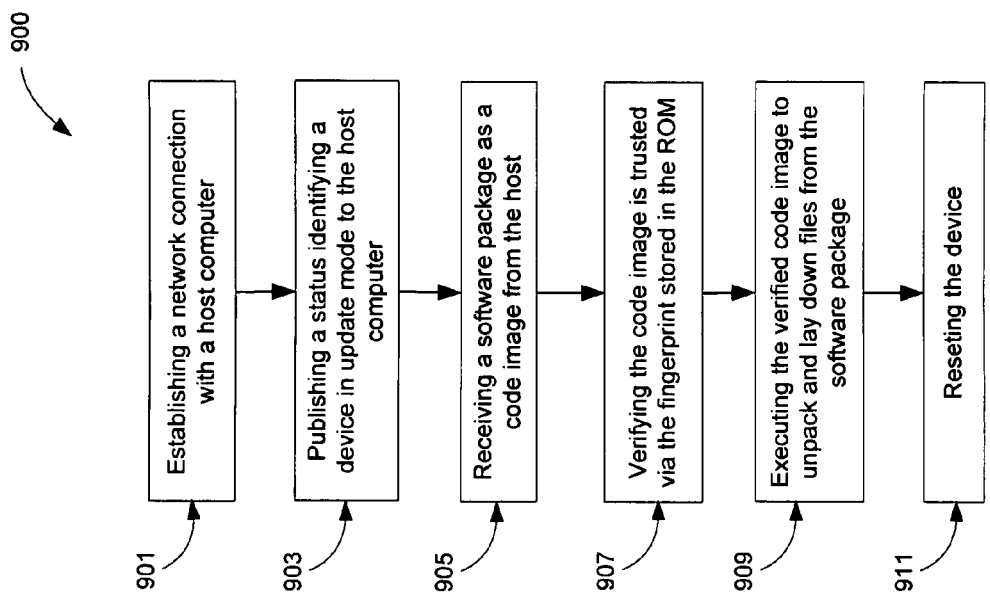
FIG. 9 is a flow diagram illustrating one embodiment of a process to securely update an application from a host to a device.

FIG. 9 is a flow diagram illustrating one embodiment of a process to securely update an application from a host to a device. For example, process 900 may be performed by systems as shown in FIGS. 1 and/or 5. The processing logic of process 900 may establish a network connection with a host computer at block 901. The device and the host computer may be connected through a network interface such as shown in FIG. 5. Update software, such as iTune from Apple Inc., may be running on the host computer to communicate with the device. The processing logic of process 800 may publish a status to the host computer to identify the device as in an update mode via the network connection at block 803. A device in an update mode may also be in a DFU mode. In one embodiment, the status may include information such as device ID and/or product ID. The status may include an indication of a version ID of an application currently residing in the device.

At block 905, according to one embodiment, the processing logic of process 900 may receive a code images from the connected host computer. The code image may include a software package related to an updated version of an application based on the version ID from the published status received by the host computer at block 903. In one embodiment, the code image may be loaded into a memory component of the device such as memory 103 as shown in FIG. 1. At block 907, according to one embodiment, the processing logic of process 900 may verify the code image is trusted. The processing logic of process 900 may perform a process such as shown in FIG. 6 to determine whether the code image could be trusted based on a fingerprint of a root certificate in a secure ROM chip such as Fingerprints 123 in chip 105 shown in FIG. 1. In one embodiment, the processing logic of process 900 may execute the verified code image to unpack files from the included software package and lay down those files inside the file system of the device at block 909. A file from the software package may be a new file or an updated version of an existing file for the device. The processing logic of process 900 may perform an integrity check against a file from the software package to ensure the file is not compromised or corrupted before laying down the file into the file system of the device. In one embodiment, the integrity of a file may be checked based on a signature according to a hash on the file content. At block 911, the processing logic of process 900 may reset the device to reboot from the operating system stored inside the device.

Figure 10:
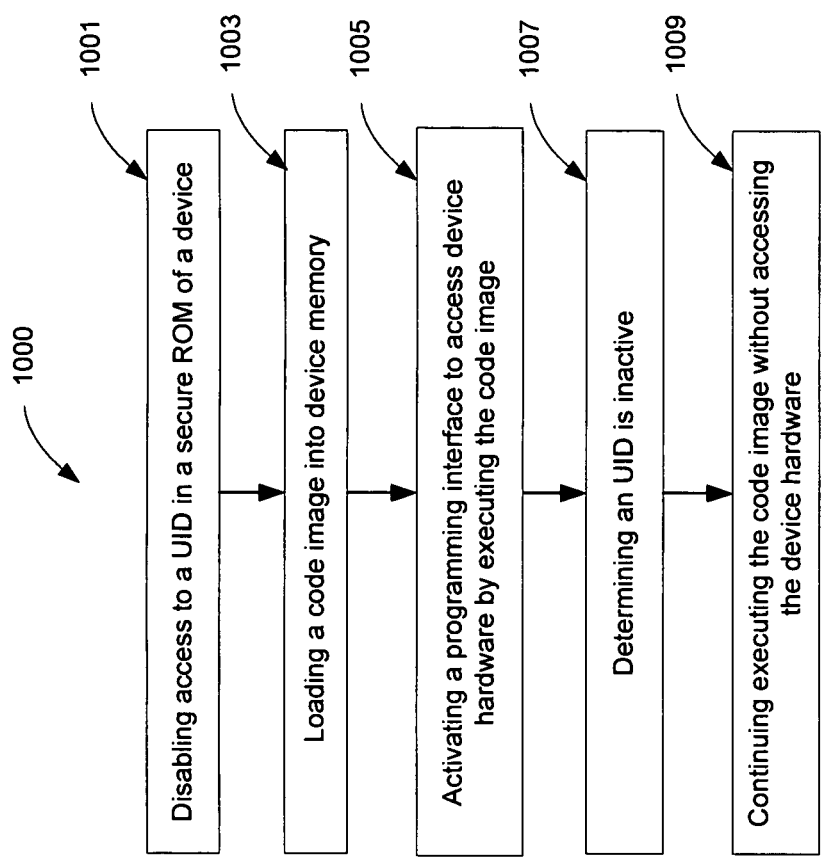
FIG. 10 is a flow diagram illustrating one embodiment of a process for executing unverified code image.

FIG. 10 is a flow diagram illustrating one embodiment of a process of executing unverified code image. For example, process 1000 may be performed by a system as shown in FIG. 1. At block 1001, the processing logic of process 1000 may disable accessing to a UID of a secure ROM in a device such as UID 119 in FIG. 1. In one embodiment, a trusted code image may be configured to turn off accessing to the UID when executed. In another embodiment, a hardware switch of the device may include settings that turn off accessing to the UID. The access configuration of the UID may be specified according to a diagnostic or testing requirement of the device. The trusted code image may be a boot image verified by codes inside a secure ROM of a device such as codes 115 in FIG. 1. In one embodiment, the verification may be performed in a similar process as shown in FIG. 6. The boot image may be LLB 225 or iBoot 227 as shown in FIG. 2. At block 1003, the processing logic of process 1000 may load a code image into a memory component of the device such as RAM 111 of FIG. 1. In one embodiment, the processing logic of process 1000 may load the code image based on a configuration of a trusted code image currently being executed. The code image may be loaded from an external network connection or a mass storage coupled to the device. In one embodiment, the code image may include diagnostic software for the device.

At block 1005, the processing logic of process 1000 may activate a programming interface to access device hardware by executing the code image. Device hardware may be accessed by reading or setting values of device hardware parameters. The processing logic may derive a hash value from the loaded code image to determine if the code image is not compromised (e.g., not corrupted). The determination may be based on a comparison between the derived hash value and a header value from the code image. In one embodiment, the processing logic of process 1000 may determine a UID is inactive at block 1007. The programming interface to access device hardware may cause an execution of codes inside a secure ROM such as codes 115 in FIG. 1 for determining whether the UID is active or not. At block 1009, the processing logic of process 1000 continues executing the code image without accessing the device hardware. In one embodiment, accessing to the device hardware may be controlled by the codes inside a secure ROM of a device based on whether the associated UID is active or not. In another embodiment, user data may not be accessible when a UID is not active. Even when an unverified application is loaded and executed in a device, no device hardware or user sensitive data may be compromised if the UID is not active.

Figure 11:
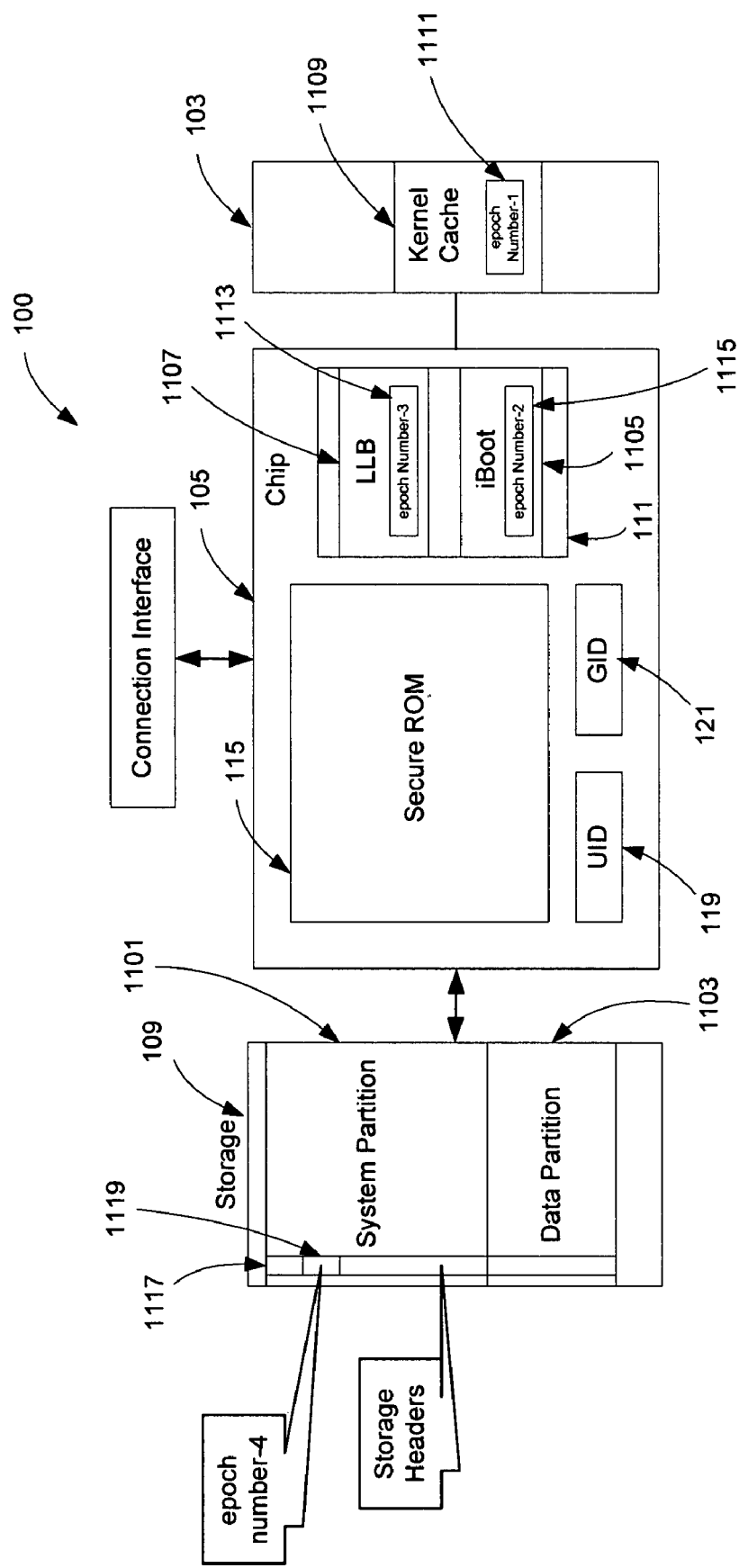
FIG. 11 is a block diagram illustrating one embodiment of system components for verifying compatible trusts in secure system booting.

FIG. 11 is a block diagram illustrating one embodiment of system components for verifying compatible trusts in secure system booting. System 100 may reside in one or more chips inside a device as shown in FIG. 1. In one embodiment, a plurality of code images may be stored in memory components of system 100 for securely booting system 100 into an operating environment. A code image may be an LLB 1107 or an iBoot 1105 stored in a NOR flash memory 111 as shown in FIG. 1. Another code image may include a KernelCache 1109 stored in a NAND flash memory 103 as shown in FIG. 1. A code image may include executable codes. In one embodiment, a code image may be associated with an epoch number such as epoch number-1 1111 of KernelCache 1109. An epoch number may represent a version of trust established on the associated code image. In one embodiment, an epoch number may be stored as a header value in the associated code image. The epoch number of a code image may be accessible during verification operations by another code image, such as operations at block 305 of process 300 of FIG. 3.

A mass storage 109 as shown in FIG. 1 may include a system partition 1101 and a data partition 1103. In one embodiment, a system partition 1101 may store operating system components and application codes for a device supporting system 100. A data partition 1103 may store user specific data such as address books, notes, music downloads and calendars, which may be accessed when system 100 executes codes loaded from a system partition 1101. In one embodiment, a system partition 1101 may be updated without changing data partition 1103. A mass storage 109 may include a storage header 1117 storing values indicating an associated hardware status. In one embodiment, storage headers 117 may include a table of contents describing which data bits are still viable for storing data in a mass storage 109. Access to storage headers 1117 may be permitted via secure operations performed during a secure booting process, such as process 300 of FIG. 3. In one embodiment, values inside storage headers 1117 may not be altered by processes other than secure booting operations.

According to another embodiment, system 100 may include hardware components and trusted code images compatible with each other for booting into an operating environment. A code image LLB 1107 may be verified as trusted by secure ROM 115 based on UID 119 and GID 121. A code image iBoot 1105 may be verified as trusted by another code image LLB 1107. A code image iBoot 1105 may be determined to be compatible in trust by another code image LLB 1107 when epoch number-3 1113 of LLB 1107 satisfies a predetermined relationship (e.g. less than or equal to) another epoch number-2 1115 of iBoot 1105. A code image KernalCache 1109 may be verified as trusted and determined as compatible in trust by another code image iBoot 1105 when epoch number-2 1115 of iBoot 1105 is not greater than epoch number-1 1111 of KernelCache 1109. Additionally, Storage 109 may be verified as compatible with KernelCache 1109 when epoch number-4 1119 of Storage 109 satisfies a predetermined relationship (e.g. less than or equal to) with epoch number-1 1111 of KernelCache 1109.

In one embodiment, trusted code images in system 100 may mutually verify a trust according to associated epoch numbers. For example, a verified code image iBoot 1105 by another code image LLB 1107 may determine whether LLB 1107 is trusted based on a predetermined relationship (e.g. less than or equal to) between epoch number-3 1113 of LLB 1107 and epoch number-2 of iBoot 1115. A code image may pass an associated epoch number to another verified code image executed by the code image. For example, LLB 1107 may pass associated epoch number-3 1113 to verified code image iBoot 1115 when executing iBoot 1115.

Thus, these components of system 100 may be sequentially verified and loaded to establish an operating environment for system 100, where a lower level component verifies an immediate higher level component in the chain. If any one of the components in the chain fails to be verified, the failed component will not be loaded and thus, the operating environment may not fully established (e.g., certain functionalities may not operate). For example, when system 100 is powered up, the boot code within the secure ROM 115 is executed. The boot code finds and verifies LLB 1107 using the embedded UID 119 and/or GID 121. Once the LLB 1107 has been authenticated, an epoch number 1113 of the LLB 1107 is revealed from the code image. The LLB 1107 then authenticates iBoot image 1105 and obtains the epoch number 1115. Although iBoot 1105 has been successfully authenticated and/or verified by LLB 1107, it may not be loaded if its corresponding epoch number does not satisfy the epoch number of LLB 1107. The LLB 1107 verifies the epoch number of iBoot by comparing the epoch number of LLB 1107 and the epoch number of iBoot 1105 to ensure that both epoch numbers satisfy a predetermined relationship. If both epoch numbers satisfy the predetermined relationship, the iBoot 1105 will be loaded by the LLB 1107. Likewise, the iBoot 1105 authenticates and verifies the epoch number of kernel cache 1109, and executes/loads the kernel cache 1109. The kernel cache 1109 in turn authenticates and verifies the rest of the system components of the operating system in sequence. Therefore, even if a hacker finds a vulnerability in a code image that could be used to attack the rest of the system, the vulnerability could not be used in another system where its epoch number is not accepted. As a result, target components for a security vulnerability are limited to systems of current or older epochs.

Figure 12:
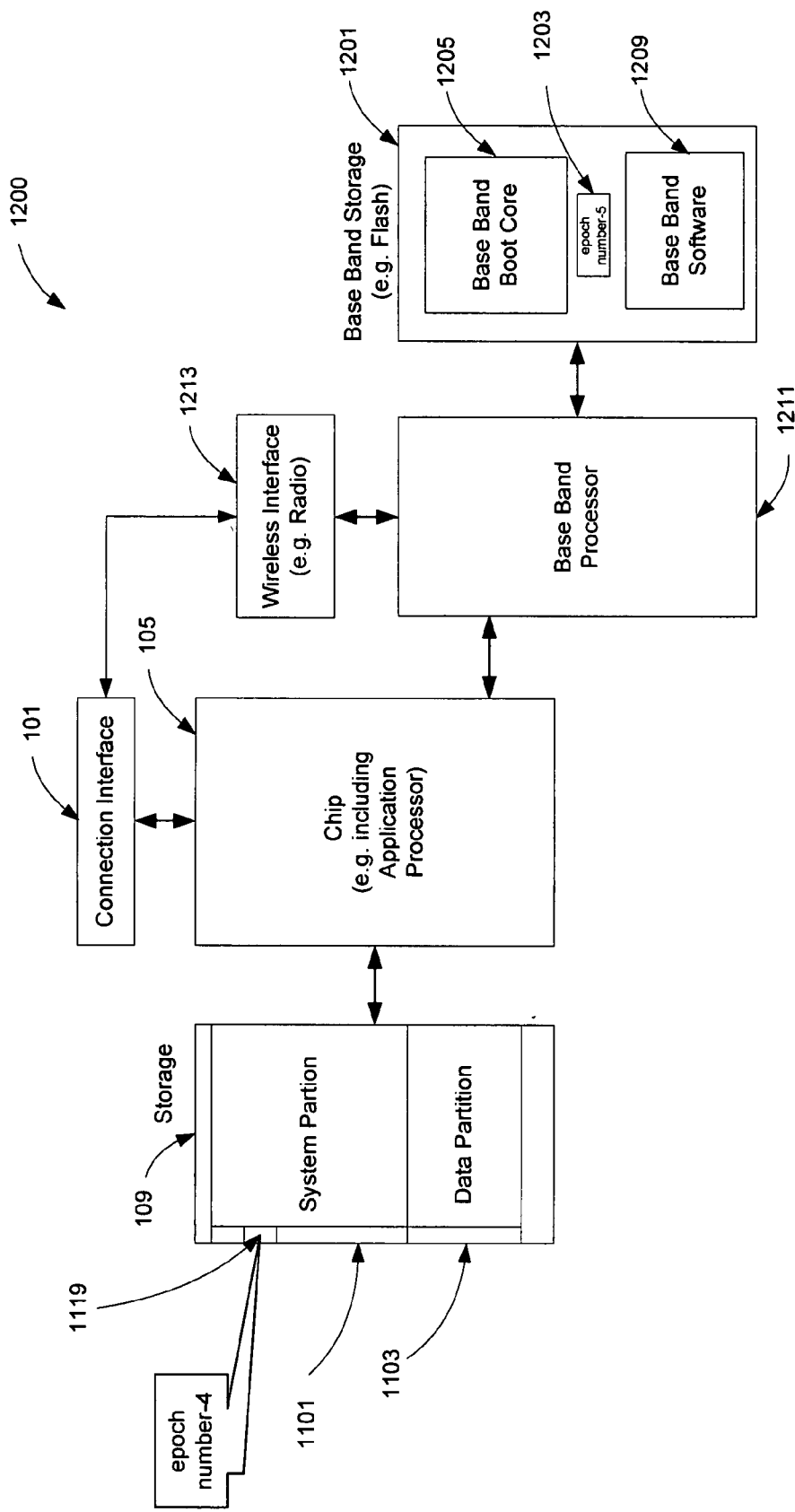
FIG. 12 is a block diagram illustrating one embodiment of system components for validating trust compatibility with an operating code running in a separate processor.

FIG. 12 is a block diagram illustrating one embodiment of system components for validating trust compatibility with an operating code running in a separate processor. System 1200 may include two processors in a single device, such as a main processor (e.g. a microprocessor or a CPU) in a chip 105 including, for example, an application processor or a main processor, as shown in FIG. 11 and a separate processor (e.g. a communication processor) such as a base band processor 1211. A base band processor 1211 may provide a main processor in chip 105 functionalities to interface with radio and/or wireless communication environments via a wireless interface 1213. A connection interface 101 associated with chip 105 may be coupled directly or indirectly with a wireless interface 1213 associated with a base band processor 1211. In one embodiment, a base band processor 1211 may execute codes loaded from a base band storage 1201 separated from a storage 109 associated with chip 105. A base band processor 1211 may be coupled with chip 105 via a local bus or interconnect.

In one embodiment, a base band storage 1201 may be a flash memory storing base band boot core 1205, base band software 1209 and epoch number-5 1203. Base band boot core 1205 may be executed by a base band processor 1211 when booting system 1200 into an operating environment. A base band processor 1211 may execute base band software 1209 to provide base band or other communication services to chip 105. Both base band boot core 1205 and base band software 1209 may be associated with epoch number-5 1203 stored in a base band storage 1201. In one embodiment, an uploading process may update epoch number-5 when loading base band boot core 1205 into base band storage 1201 during a restoration, recovery, or updates for system 1200. Epoch number-5 1203 may be accessible by both base band boot core 1205 and/or base band software 1209. In one embodiment, epoch number-5 1203 may be of the same value as epoch number-4 1119 stored in storage 109 associated with chip 105 of system 1200 or alternatively, they may have a predetermined relationship.

Figure 13:
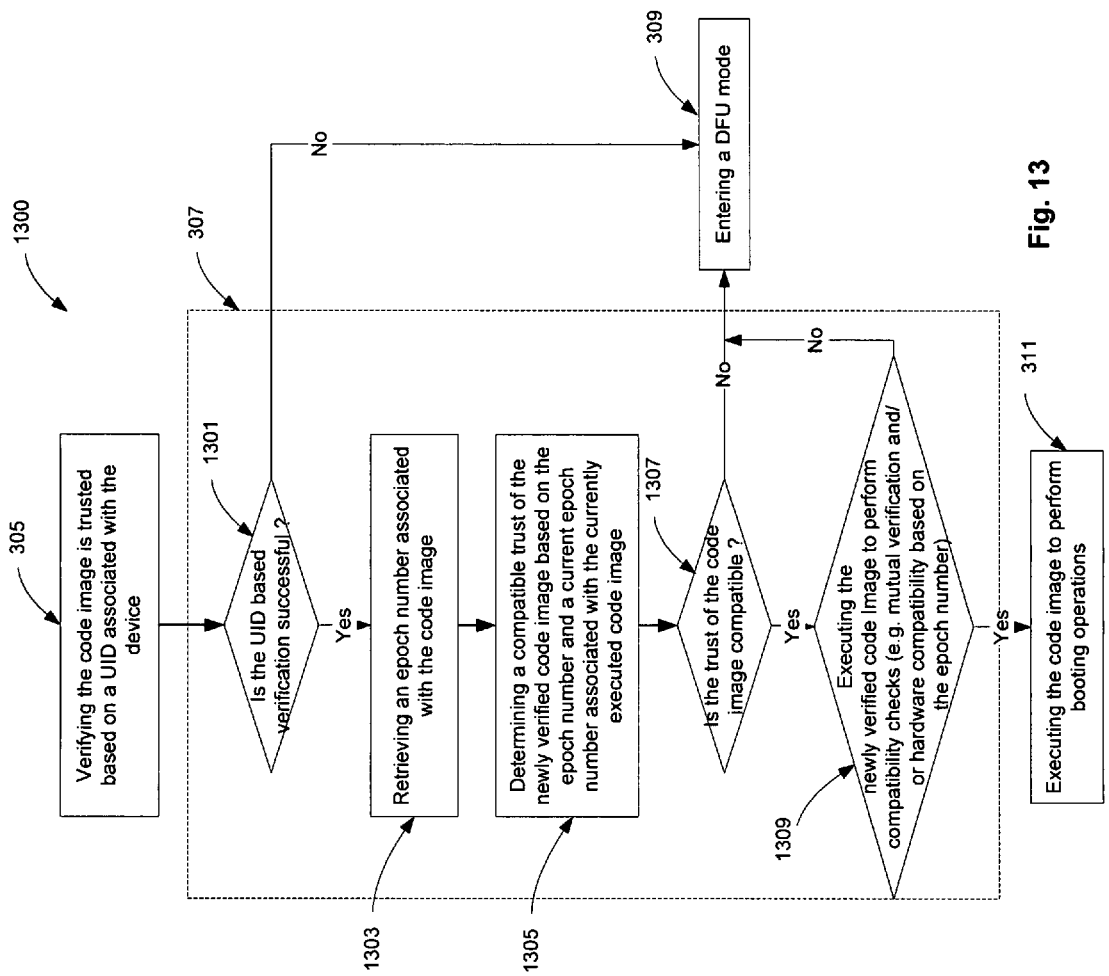
FIG. 13 is a flow diagram illustrating one embodiment of a process to revoke a code image without a compatible trust.

FIG. 13 is a flow diagram illustrating one embodiment of a process to revoke a code image without a compatible trust. Process 300 at block 307 of FIG. 3 may be performed in accordance with process 1300 by systems such as shown in FIGS. 11 and 12. In one embodiment, the processing logic of process 1300 may retrieve an epoch number associated with a code image at block 1303 if the code image is successfully verified/authenticated as a trusted code image at block 1301. If no trust can be established on the code image, the processing logic of process 300 may enter a DFU mode such as DFU mode at block 309 of FIG. 3. A code image may be verified as trusted according to process 300 as shown in FIG. 3 based on an UID associated with a device for the processing logic of process 1300. An epoch number may be stored within an associated code image. In one embodiment, an epoch number may be encrypted. Once a trust has been established on an associated code image, an encrypted epoch number may be decrypted.

At block 1305, the processing logic of process 1300 may determine whether an established trust on a code image is compatible with a currently executed code image, such as code image LLB 1107 of FIG. 11. In one embodiment, the processing logic of process 1300 may compare epoch numbers associated with code images to determine compatibility of an established trust on a code image. If the retrieved epoch number at block 1303 associated with the newly verified code image is Et and the epoch number associated with the currently executed code image is Es, in one embodiment, the processing logic may determine the newly verified code image has a compatible trust with the currently executed coded image if the Et and Es satisfy a predetermined relationship such as, for example, Et≧Es. At block 1307, if the newly verified code image is determined to have an incompatible trust, the processing logic of process 1300 may revoke the established trust of the newly verified code image and enter a DFU mode for a device performing process 1300.

At block 1309, in one embodiment, if the newly verified code image is determined to have a compatible trust, the processing logic of process 1300 may execute the newly verified code image to conduct further compatibility check. The newly verified code image may perform reverse verification against a calling code image which has already determined a trust compatibility with the verified code image, for example, according to process 1300 at block 1305. The newly verified code image may compare an associated epoch number with an epoch number from a calling image code to determine a compatibility according to a predetermined relationship, such as, for example, two epoch numbers match each other or the epoch number from the calling image should not be greater than an epoch number with the newly verified code image. In one embodiment, a calling image code may pass a data structure including an epoch number to a verified image code when executing the verified image code.

In another embodiment, the newly verified code image may determine if a hardware component of a device is compatible with the newly verified code image. A hardware component may be a mass storage inside the device, such as storage 109 of FIG. 11. In one embodiment, a verified code image, such as code image iBoot 1105 of FIG. 11, may execute without determining if an associated hardware component is compatible. The processing logic of process 1300 may retrieve a hardware epoch number stored in a location of a hardware component, such as storage 109 of FIG. 11. A hardware epoch number may be stored in a predetermined location, such as a header storing a value, e.g. storage header 1117 in storage 109 of FIG. 11, accessible to a verified code image.

The processing logic of process 1300 may compare a hardware epoch number with an epoch number associated with a verified code image at block 1309. In one embodiment, the processing logic of process 1300 may determine a hardware component is not compatible if a retrieved hardware epoch number is greater than an epoch number Et associated with a verified code image. If a hardware component is determined to be compatible at block 1309, the processing logic of process 1300 may update an associated hardware epoch number in a hardware component to be equal to an epoch number Et of a verified code image. For example, storage headers 1117 may be updated with a new epoch number at location 1119 of storage 109 in FIG. 11. In one embodiment, updating a header value in a storage component in a device may be an exclusive right belonging to a verified code image having a compatible trust. The processing logic of process 1300 may enter a DFU mode if a hardware component is determined not compatible at block 1309. Otherwise, at block 311, the processing logic of process 1300 may continue executing a verified code image to perform booting operations. A device may operate in a trusted state when successfully booted into an operating environment according to process 300 of FIG. 3 including process 1300 of FIG. 13.

In one embodiment, when executing boot instructions from a Secure ROM such as in block 301 of process 300, a certain hardware test points (e.g. via solid states relays, etc.) may be checked to determine if a hardware associated with a device has been altered. If the hardware has been altered, boot instructions may self destruct (e.g., by wiping out the boot code stored in the ROM) and abort booting process. As a result, the whole device is permanently dead and optionally the owner may be required to contact a service provider to re-enable the device, e.g. re-burn the boot code into the ROM.

Figure 14:
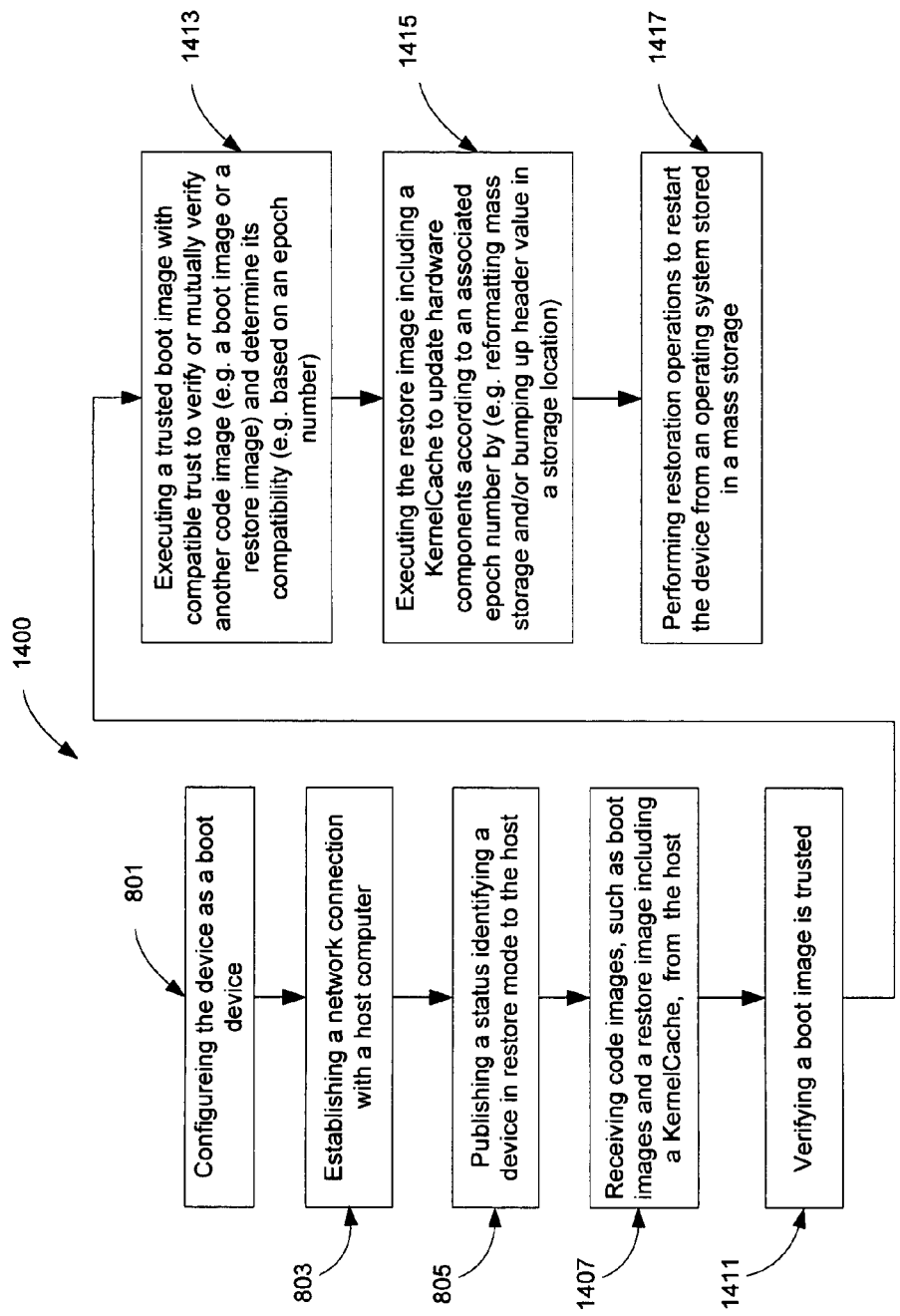
FIG. 14 is a flow diagram illustrating one embodiment of a process to restore an operating environment to a device according to a compatible trust.

FIG. 14 is a flow diagram illustrating one embodiment of a process to restore an operating environment to a device according to a compatible trust. For example, process 1400 may be performed by systems as shown in FIGS. 11 and/or 12. In one embodiment, the processing logic of process 1400 may configure a boot device in a restore mode connected with a host computer at blocks 801, 803 and 805 similar to the processing logic of process 800 in FIG. 8. At block 1407, in one embodiment, the processing logic of process 1400 may receive code images from a connected host computer. Code images received may include boot images and a restore image. Boot images may be executed to perform secure booting operations to boot a device into an operating environment, such as code image LLB 1107 and code image iBoot 1105 of FIG. 11. A restore image may include a kernel cache for an operating system, such as KernelCache 1109 of FIG. 11.

At block 1411, in one embodiment, the processing logic of process 1400 may verify a received boot image is trusted to start a series of secure operations to restore a device into a trusted state. The processing logic of process 1400 may execute secure codes stored inside a secure ROM, such as codes 115 of FIG. 2 to verify a loaded boot image. In one embodiment, a loaded boot image at block 1411 may be an LLB, such as code image LLB 1107 of FIG. 11. A trusted boot image at block 1411 may be associated with an epoch number. In one embodiment, secure codes from a secure ROM may be compatible with a verified boot image regardless of the associated epoch number. At block 1413, the processing logic of process 1400 may execute a boot image with compatible trust to verify another code image, e.g. a boot image or a restore image, and determine whether a verified code image is compatible in trust. In one embodiment, the processing logic of process 1400 may verify a compatibility with a calling boot image at block 1413 to enforce mutual verification between two boot images, such as between code image LLB 1107 and code image iBoot 1105 of FIG. 11. In one embodiment, the processing logic of process 1400 may perform verification and determine compatibility based on epoch numbers associated with code images in a similar way as the processing logic of process 1300 in FIG. 13 and the processing logic of process 300 of FIG. 3. For example, a trusted boot image LLB 1107 of FIG. 11 may verify boot image iBoot 1105 of FIG. 11 as trusted and compatible according to associated epoch numbers. In one embodiment, the processing logic of process 1400 may determine a trusted code image is compatible if an epoch number associated with the trusted code is available, regardless of its value.

At block 1415, in one embodiment, the processing logic of process 1400 may execute a restore image which has been verified with a compatible trust at block 1413 to restore and/or recover an operating system via an included kernel cache. For the operating system. In one embodiment, a restore image may execute in the device without receiving commands from a remote host. Executing a kernel cache from a restore image may install basic operating system components into an associated device. In one embodiment, executing a kernel cache may update hardware components in a device, such as reformatting a mass storage, e.g. Storage 109 of FIG. 11. In one embodiment, a kernel cache may cause an update on a system partition of a storage unit, such as System Partition 1101 of FIG. 11, while retaining the contents of a corresponding data partition, such as Data Partition 1103 of FIG. 11.

A kernel cache may be associated with an epoch number Ec for verifying a compatibility of a hardware component. In one embodiment, the processing logic of process 1400 at block 1415 may retrieve a hardware epoch number Eh from a hardware component, such as a header value in a mass storage unit of a device, e.g. Storage Headers 1117 of FIG. 11. The processing logic of process 1400 may compare a hardware epoch number Eh with the epoch number Ec associated with a kernel cache. If the Ec and Eh satisfy a predetermined relationship, such as, for example, Ec is less than Eh, in one embodiment, the processing logic of process 1400 may consider the associated hardware component and the kernel cache not compatible. If Ec is equal or greater than Eh, for example, in another embodiment, the processing logic of process 1400 may consider the hardware component as compatible. In one embodiment, the processing logic of process 1400 may not restore a device into a complete operating environment if a hardware component is found to be not compatible. An incomplete operating environment may be based on an operating system running with reduced functionalities. In one embodiment, the processing logic of process 1400 may update header values of a compatible hardware component according to an epoch number Ec associated with a kernel cache, such as bumping up the hardware epoch number stored in a header of a mass storage device to be equal to Ec. At block 1417, the processing logic of process 1400 may continue restoration operations by rebooting a device according to the restored/recovered operating system installed in a mass storage unit of a device.

Figure 15:
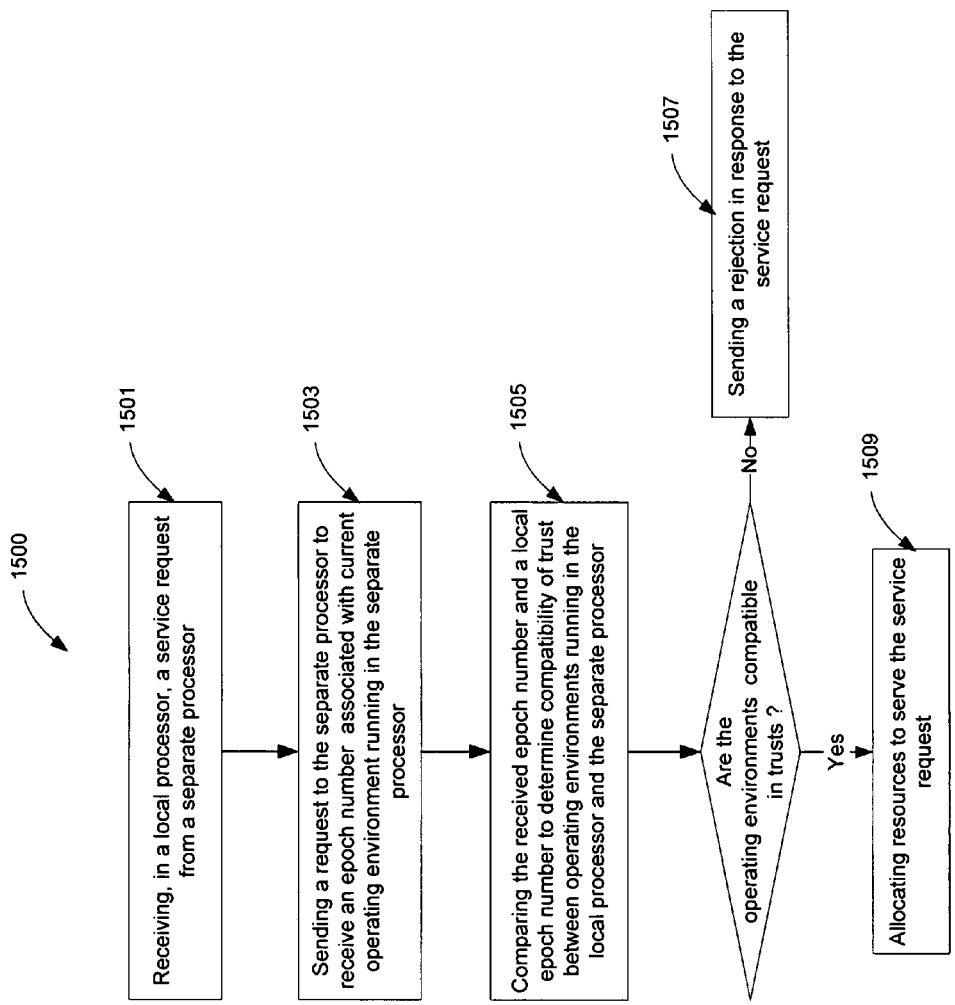
FIG. 15 is a flow diagram illustrating one embodiment to verify compatible trust when providing services to operating environments in separate processors.

FIG. 15 is a flow diagram illustrating one embodiment to verify compatible trust when providing services to operating environments in separate processors. Process 1500 may be performed, for example, by system 1200 of FIG. 12. In one embodiment, the processing logic of process 1500 may receive a service request from a separate processor, such as a main processor inside Chip 105 of FIG. 12. The processing logic of process 1500 may be associated with a communication processor, e.g. Base Band Processor 1211 of FIG. 12. In one embodiment, the processing logic of process 1500 may receive a radio interface service request from a system bus coupling two separate processors in a single device. At block 1503, in one embodiment, the processing logic of process 1500 may send a request to the separate processor to receive an epoch number associated with a current operating environment running in the separate processor, such as a main processor inside Chip 105 of FIG. 12. An operating environment for a processor running an operating system may be associated with an epoch number according to system code images, such as LLB 1107, iBoot 1115 or KernelCache 1109 of FIG. 11. In one embodiment, an operating system may be associated with an epoch number having a value as the smallest one among epochs numbers associated with its boot images, such as epoch number-3 1113, epoch number-2 1115 or epoch number-1 1111 of FIG. 11.

At block 1505, in one embodiment, the processing logic of process 1500 may compare a received epoch number with a local epoch number associated with a current operating environment running in a local processor to determine compatibility in trust between operating environments running in the separate processor and the local processor. A local epoch number may be stored in a storage component associated with the local processor, such as epoch number-5 1203 of Base Band Storage 1201 as shown in FIG. 12. In one embodiment, a local epoch number may be written into a storage unit during system restoration, recovery or updates according to installed boot images for the local processor, such as Base Band Boot Core 1205 of FIG. 12. In another embodiment, epoch numbers for operating environments running in a separate processor, such as a processor inside Chip 105 of FIG. 12, and a local processor, such as Base Band Processor 1211 of FIG. 12, may be updated during a single transaction session, such as established via the connection of block 803 of FIG. 14, between a remote host and a device including the two processors.

The processing logic of process 1500 may determine compatibility based on whether a received epoch number and a local epoch number satisfy a predetermined relationship (e.g. greater than or equal to, etc.) In one embodiment, if an operating environment running in a separate processor does not have a compatible trust with a local operating environment running in a local processor, such as when a received epoch number is less than a local epoch number, for example, the processing logic of process 1500 may reject the service request at block 1507. Otherwise, at block 1509, the processing logic of process 1500 may proceed to allocate resources, such as memory or processing capacity, to serve the requested service of block 1501. For example, if a base band operating system running in Base Band Processor 1211 of FIG. 12 is with a larger epoch number than the epoch number associated with a phone operating system running in Chip 105 of FIG. 12, a device running system 1200 of FIG. 12 may not have radio interface services provided by the base band operating system.

Figure 16:
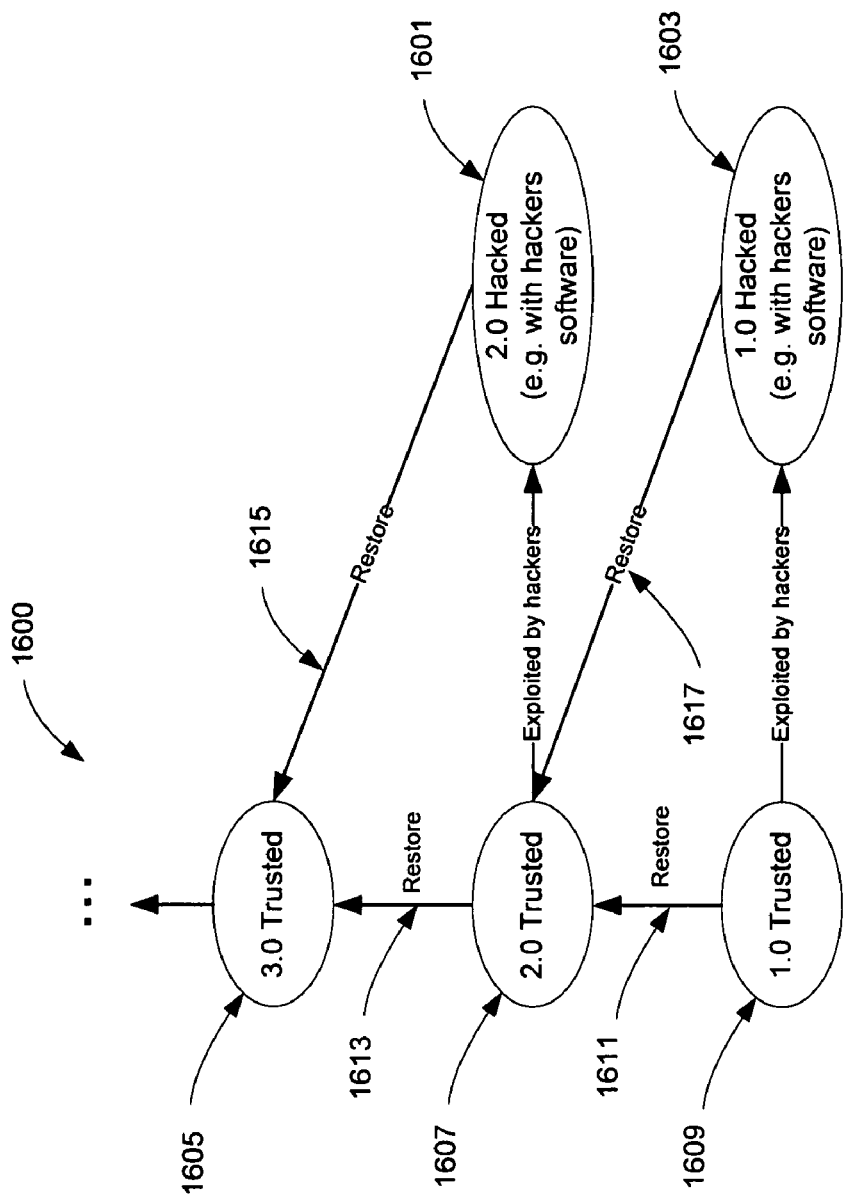
FIG. 16 is a state diagram illustrating an embodiment of a process to perform continued revocation of trusted systems based on epoch numbers.

FIG. 16 is a state diagram illustrating an embodiment of a process to perform continued revocation of trusted systems based on epoch numbers. A trusted system may be assigned an epoch number such as 1.0 in trusted state 1309. A system securely booted into an operating environment, such as according to process 300 of FIG. 3 and process 1300 of FIG. 13, may be in a trusted state with an epoch number. A trusted system may remain in a trusted state when installed with additional trusted codes verified according to a trust verification process such as block 305 of process 300 of FIG. 3. A trusted system may be exploited by hackers, such as installed with unauthorized software without being verified as trusted. A trusted system at a trusted state, such as state 1609 with epoch number 1.0, may enter into a hacked state, such as hacked state 1603 with epoch number 1.0, when exploited by hackers. In one embodiment, a trusted state or a hacked state with an epoch number may be restored into another trusted state with a higher epoch number, such as trusted state 1607 with epoch number 2.0 restored from either trusted state 1609 with epoch number 1 or hacked state 1603 with epoch number 1.0. Trusted state restorations from a lower epoch number to a higher epoch number, such as Restore 1611 or Restore 1617, may be based on process 1300 of FIG. 13. In one embodiment, a boot image having a higher epoch number may revoke a trust previously established on another boot image having a lower epoch number during system restoration, recovery or updates. A restored trusted state, such as trusted state 1607 with epoch number 2, may be hacked into a hacked state 1601 with epoch number 2. Trust restorations such as Restore 1613 or Restore 1615 may be performed to restore a system to a trusted state 1605 with epoch number 3, similar to Restore 1611 or Restore 1617.

Figure 17:
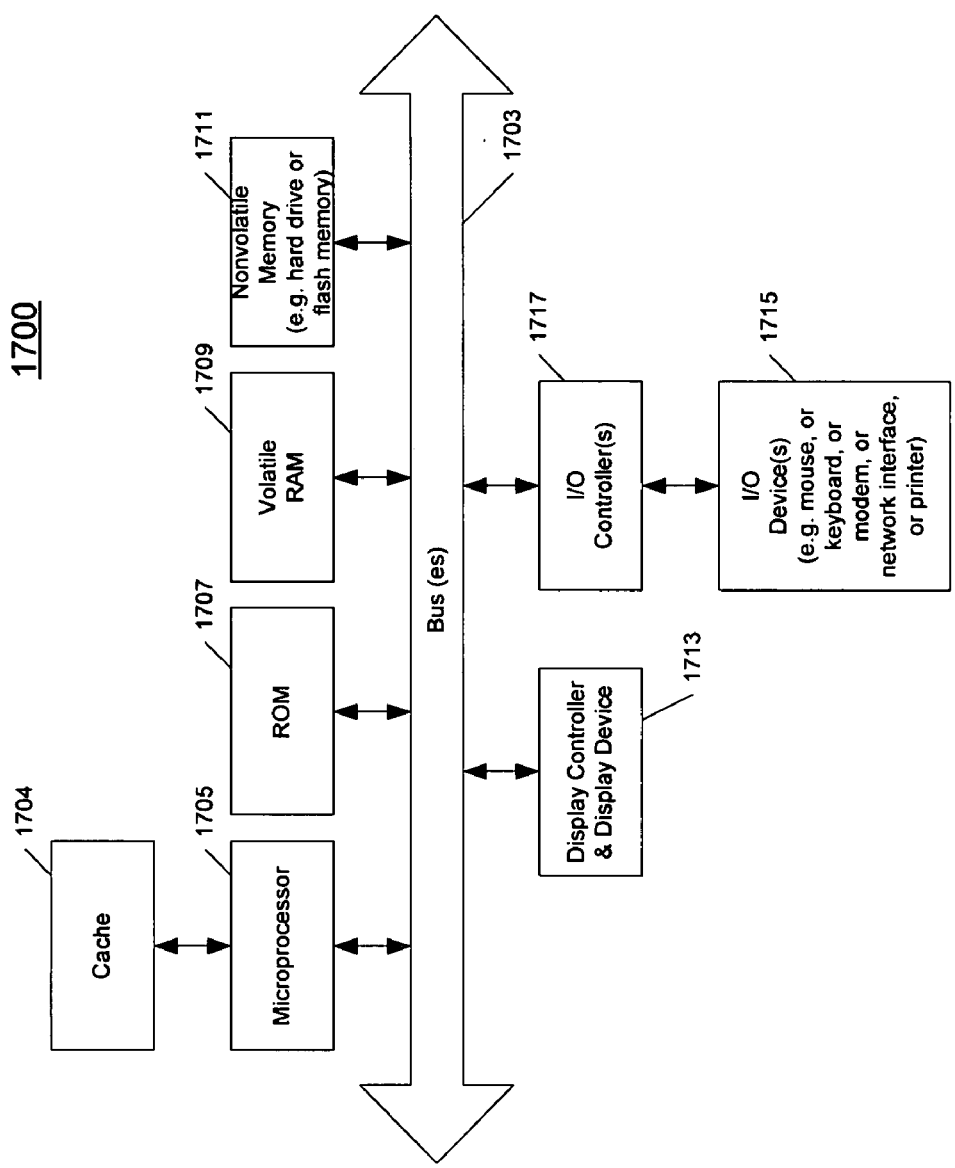
FIG. 17 illustrates one example of a typical computer system which may be used in conjunction with the embodiments described herein.

FIG. 17 shows one example of a data processing system which may be used with one embodiment of the present invention. For example, the system 1700 may be implemented including a host as shown in FIG. 5. Note that while FIG. 17 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 17, the computer system 1700, which is a form of a data processing system, includes a bus 1703 which is coupled to a microprocessor(s) 1705 and a ROM (Read Only Memory) 1707 and volatile RAM 1709 and a non-volatile memory 1711. The microprocessor 1705 may retrieve the instructions from the memories 1707, 1709, 1711 and execute the instructions to perform operations described above. The bus 1703 interconnects these various components together and also interconnects these components 1705, 1707, 1709, and 1711 to a display controller and display device 1713 and to peripheral devices such as input/output (I/O) devices which may be mice, keyboards, modems, network interfaces, printers and other devices which are well known in the art. Typically, the input/output devices 1715 are coupled to the system through input/output controllers 1717. The volatile RAM (Random Access Memory) 1709 is typically implemented as dynamic RAM (DRAM) which requires power continually in order to refresh or maintain the data in the memory.

The mass storage 1711 is typically a magnetic hard drive or a magnetic optical drive or an optical drive or a DVD RAM or a flash memory or other types of memory systems which maintain data (e.g. large amounts of data) even after power is removed from the system. Typically, the mass storage 1711 will also be a random access memory although this is not required. While FIG. 17 shows that the mass storage 1711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1703 may include one or more buses connected to each other through various bridges, controllers and/or adapters as is well known in the art.

Figure 18:
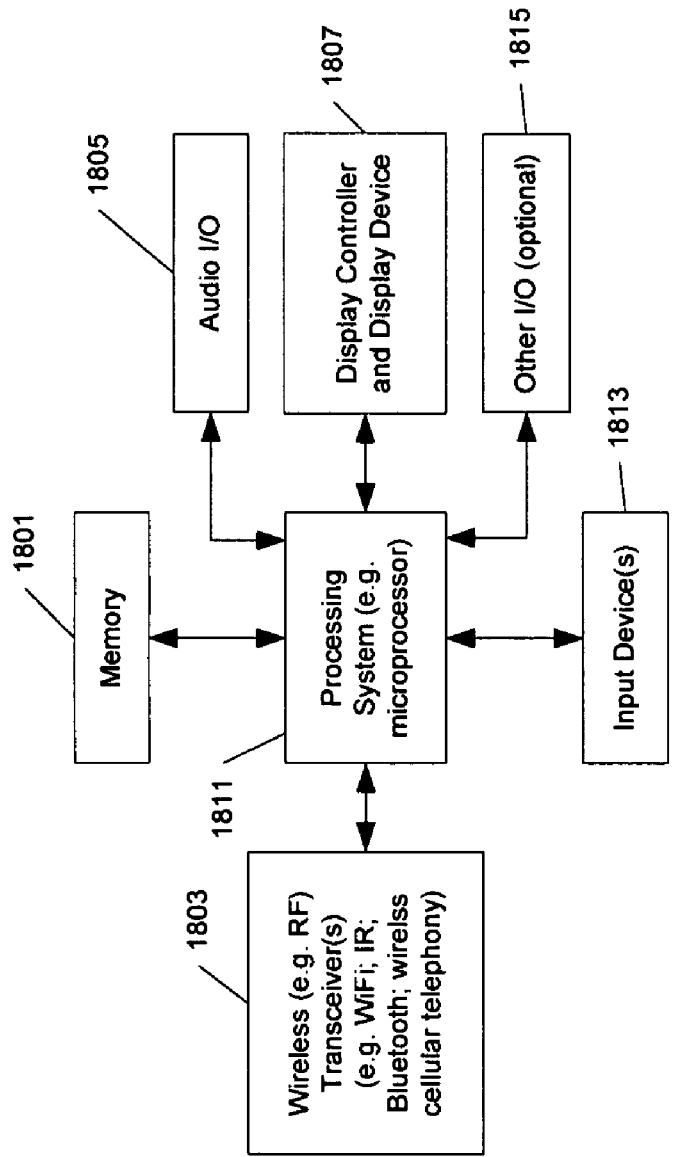
FIG. 18 shows an example of a data processing system which may be used with one embodiment of the present invention

FIG. 18 shows an example of another data processing system which may be used with one embodiment of the present invention. For example, system 1800 may be implemented as part of system as shown in FIG. 1. The data processing system 1800 shown in FIG. 18 includes a processing system 1811, which may be one or more microprocessors, or which may be a system on a chip integrated circuit, and the system also includes memory 1801 for storing data and programs for execution by the processing system. The system 1800 also includes an audio input/output subsystem 1805 which may include a microphone and a speaker for, for example, playing back music or providing telephone functionality through the speaker and microphone.

A display controller and display device 1807 provide a visual user interface for the user; this digital interface may include a graphical user interface which is similar to that shown on a Macintosh computer when running OS X operating system software. The system 1800 also includes one or more wireless transceivers 1803 to communicate with another data processing system, such as the system 1100 of FIG. 11. A wireless transceiver may be a WiFi transceiver, an infrared transceiver, a Bluetooth transceiver, and/or a wireless cellular telephony transceiver. It will be appreciated that additional components, not shown, may also be part of the system 1800 in certain embodiments, and in certain embodiments fewer components than shown in FIG. 18 may also be used in a data processing system.

The data processing system 1800 also includes one or more input devices 1813 which are provided to allow a user to provide input to the system. These input devices may be a keypad or a keyboard or a touch panel or a multi touch panel. The data processing system 1800 also includes an optional input/output device 1815 which may be a connector for a dock. It will be appreciated that one or more buses, not shown, may be used to interconnect the various components as is well known in the art. The data processing system shown in FIG. 18 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1800 may be a network computer or an embedded processing device within another device, or other types of data processing systems which have fewer components or perhaps more components than that shown in FIG. 18.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method for establishing an operating environment of a device, the method comprising:
   executing a first executable code image in a memory of a device in an attempt to establish an operating environment of the device, the first executable code image being associated with a first version number;
   the first executable code image, which when executed from the memory, authenticating a second executable code image, which when successful, to retrieve a second version number from the second executable code image; and
   the first and second executable code images mutually verifying compatibility between the first and second code images, wherein the mutual verification is capable of preventing the second executable code image from being loaded by the first executable code image if the first version number and the second version number do not satisfy a predetermined relationship and wherein the mutual verification interrupts execution of the second executable code image if the first and second version numbers do not satisfy the predetermined relationship and the second executable code image is loaded by the first executable code image.

2. The method of claim 1, wherein the second version number of the second executable code image is revealed from the second executable code image when the second executable code image is successfully authenticated by the first executable code image.

3. The method of claim 1, further comprising the first executable code image loading the second executable code image only if the first version number and the second version number satisfy the predetermined relationship.

4. The method of claim 3, wherein the second code image is loaded for the execution to receive the first version number from the first executable code image, and wherein the mutual verification comprises:
   verifying a compatibility with the first code image based on the first version number and the second version number; and
   interrupting the executing the second executable code image if the compatibility is not verified.

5. The method of claim 4, wherein the compatibility is verified according to the predetermined relationship.

6. The method of claim 1, wherein the second executable code image is prevented from being loaded when the first version number is higher than the second version number.

7. The method of claim 1, wherein the predetermined relationship includes matching the first version number and the second version number.

8. The method of claim 6 further comprising restoring at least the second executable code image from a host communicatively coupled to the device if the first version number and the second version number satisfy the predetermined relationship, the restored second executable code image having a third version number higher than at least one of the first version number and the second version number.

9. The method of claim 1, wherein the first executable code image is executed by a boot code stored in a secure ROM (read-only memory) of the device, wherein the boot code is configured to authenticate the first executable code image using a hardware key embedded within the device.

10. The method of claim 1, wherein the device is a portable device.

11. A non-transitory computer-readable storage medium having instructions stored therein, which when executed by a machine, cause a machine to perform a method for establishing an operating environment of a device, the method comprising:
   executing a first executable code image into in a memory of a device in an attempt to establish an operating environment of the device, the first executable code image being associated with a first version number;
   the first executable code image, which when executed from the memory, authenticating a second executable code image, which when successful, to retrieve a second version number from the second executable code image; and
   the first and second executable code images mutually verifying compatibility between the first and second code images, wherein the mutual verification is capable of preventing the second executable code image from being loaded by the first executable code image if the first version number and the second version number do not satisfy a predetermined relationship and wherein the mutual verification interrupts execution of the second executable code image if the first and second version numbers do not satisfy the predetermined relationship and the second executable code image is loaded by the first executable code image.

12. The computer-readable storage medium of claim 11, wherein the second version number of the second executable code image is revealed from the second executable code image when the second executable code image is successfully authenticated by the first executable code image.

13. The computer-readable storage medium of claim 11, wherein the method further comprises the first executable code image loading the second executable code image only if the first version number and the second version number satisfy the predetermined relationship.

14. The computer-readable storage medium of claim 13, wherein the second code image is loaded for the execution to receive the first version number from the first executable code image, and wherein the mutual verification comprises:
   verifying a compatibility with the first code image based on the first version number and the second version number; and
   interrupting the executing the second executable code image if the compatibility is not verified.

15. The computer-readable storage medium of claim 11, wherein the second executable code image is prevented from being loaded when the first version number is higher than the second version number.

16. The computer-readable storage medium of claim 11, wherein the second executable code image is prevented from being loaded if the second version number cannot be retrieved from the second executable code image.

17. The computer-readable storage medium of claim 15, wherein the method further comprises restoring at least the second executable code image from a host communicatively coupled to the device if the first version number and the second version number satisfy the predetermined relationship, the restored second executable code image having a third version number higher than at least one of the first version number and the second version number.

18. The computer-readable storage medium of claim 11, wherein the first executable code image is executed by a boot code stored in a secure ROM (read-only memory) of the device, wherein the boot code is configured to authenticate the first executable code image using a hardware key embedded within the device.

19. The computer-readable storage medium of claim 11, wherein the device is a portable device.

20. A computer-implemented method for establishing an operating environment of a device, the method comprising:
   authenticating a first and second executable images to be loaded into a memory of the device in an attempt to establish an operating environment of the device;
   in response to successfully authenticating the first and second executable code images, examining a first version number stored in the first executable code image and a second version number stored in the second executable code image for a compatibility between the first and second executable code images; and
   mutually verifying the compatibility between the first and second code images based on the first and second version numbers, wherein the compatibility is verified if the first and second version numbers satisfy a predetermined condition, wherein the mutual verification is capable of preventing the second executable code image from being loaded if the compatibility is not verified and wherein the mutual verification interrupts execution of the second executable code image if the compatibility is not verified and the second code image is loaded in the memory.

21. The method of claim 20, wherein the second executable code image is executed only if the second executable code image is successfully authenticated and the first and second version numbers satisfy the predetermined condition.

22. A computer-implemented method, comprising:
   receiving a plurality of executable code images to be loaded in sequence in order to establish an operating environment of a portable device; and
   sequentially authenticating the plurality of executable code images, wherein a current executable code image is configured to authenticate a next executable code image in the sequence and upon successfully authenticating the next executable code image, to examine a first version of the next executable code image, wherein the next executable code image is configured to examine a second version of the current executable code image, wherein the first and second executable code images are configured to mutually verify a compatibility between the current and next executable code images based on whether the first and second versions satisfy a predetermined relationship, wherein the mutual verification is capable of preventing the next executable code image from being loaded if the compatibility is not verified and wherein the mutual verification interrupts execution of the next executable code image if the compatibility is not verified and the next executable code image is loaded.

* * * * *